United States Patent
Borud et al.

(10) Patent No.: US 12,311,728 B2
(45) Date of Patent: May 27, 2025

(54) HYBRID UTILITY VEHICLE

(71) Applicant: Polaris Industries Inc., Medina, MN (US)

(72) Inventors: Eric J. Borud, Roseau, MN (US); Jeremy M. Markstrom, La Crosse, WI (US); Michael A. Thomas, Salol, MN (US); Greg B. Miner, West Haven, UT (US); Christopher P. Matko, Chisago City, MN (US); Bradley A. Bracht, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 12 days.

(21) Appl. No.: 18/212,970

(22) Filed: Jun. 22, 2023

(65) Prior Publication Data

US 2023/0339286 A1    Oct. 26, 2023

Related U.S. Application Data

(63) Continuation of application No. 17/838,903, filed on Jun. 13, 2022, now Pat. No. 12,194,808, which is a continuation of application No. 16/414,217, filed on May 16, 2019, now Pat. No. 11,370,266.

(51) Int. Cl.
*B60H 1/00* (2006.01)

(52) U.S. Cl.
CPC ......... *B60H 1/004* (2013.01); *B60H 1/00278* (2013.01); *B60H 1/00878* (2013.01); *B60H 2001/00928* (2013.01)

(58) Field of Classification Search
CPC ........................... B60H 1/004; B60H 1/00278; B60H 1/00878; B60H 2001/00928

USPC ........................................................... 62/236
See application file for complete search history.

(56) References Cited

U.S. PATENT DOCUMENTS

| | | | |
|---|---|---|---|
| 1,138,122 | A | 5/1915 | Lambert et al. |
| 1,551,594 | A | 9/1925 | Walter |
| 1,989,585 | A | 1/1935 | Bigelow |
| 2,623,612 | A | 12/1952 | Scheiterlein |

(Continued)

FOREIGN PATENT DOCUMENTS

| | | |
|---|---|---|
| AU | 2010260151 A1 | 2/2012 |
| AU | 2012239991 A1 | 10/2013 |

(Continued)

OTHER PUBLICATIONS

Office Action issued by the Canadian Intellectual Property Office, dated Mar. 22, 2024, for Canadian Patent Application No. 3,138,437; 7 pages.

(Continued)

*Primary Examiner* — Hau V Phan
(74) *Attorney, Agent, or Firm* — Faegre Drinker Biddle & Reath LLP

(57) ABSTRACT

A cooling assembly for a hybrid vehicle includes a first cooling system configured to cool an engine and a second cooling system separate from the first cooling system and configured to cool a plurality of electrical components. The second cooling system is configured with a first method of cooling at least a first electrical component and is configured with a second method of cooling at least a second electrical component. The first method of cooling is different from the second method of cooling.

22 Claims, 21 Drawing Sheets

(56) References Cited

U.S. PATENT DOCUMENTS

| | | |
|---|---|---|
| 3,278,221 A | 10/1966 | Jaulmes |
| 3,284,129 A | 11/1966 | Jaulmes |
| 3,294,190 A | 12/1966 | Tosun et al. |
| 3,523,592 A | 8/1970 | Fenton |
| 3,558,076 A | 1/1971 | Ciniglio |
| 3,694,661 A | 9/1972 | Minowa |
| 3,708,028 A | 1/1973 | Hafer |
| 3,874,472 A | 4/1975 | Deane |
| 4,010,725 A | 3/1977 | White |
| 4,022,272 A | 5/1977 | Miller |
| 4,042,054 A | 8/1977 | Ward |
| 4,150,655 A | 4/1979 | Forlai et al. |
| 4,254,843 A | 3/1981 | Han et al. |
| 4,337,406 A | 6/1982 | Binder |
| 4,388,583 A | 6/1983 | Krueger |
| 4,404,936 A | 9/1983 | Tatebe et al. |
| 4,405,028 A | 9/1983 | Price |
| 4,405,029 A | 9/1983 | Hunt |
| 4,434,934 A | 3/1984 | Moser et al. |
| 4,470,389 A | 9/1984 | Mitadera et al. |
| 4,602,694 A | 7/1986 | Weldin |
| 4,638,172 A | 1/1987 | Williams |
| 4,685,430 A | 8/1987 | Ap |
| 4,688,529 A | 8/1987 | Mitadera et al. |
| 4,697,660 A | 10/1987 | Wu et al. |
| 4,779,905 A | 10/1988 | Ito et al. |
| 4,898,261 A | 2/1990 | Winberg et al. |
| 5,018,490 A | 5/1991 | Martin |
| 5,036,939 A | 8/1991 | Johnson et al. |
| 5,148,883 A | 9/1992 | Tanaka et al. |
| 5,212,431 A | 5/1993 | Origuchi et al. |
| 5,251,588 A | 10/1993 | Tsujii et al. |
| 5,251,721 A | 10/1993 | Ortenheim |
| 5,255,733 A | 10/1993 | King |
| 5,264,764 A | 11/1993 | Kuang |
| 5,341,280 A | 8/1994 | Divan et al. |
| 5,359,247 A | 10/1994 | Baldwin et al. |
| 5,382,833 A | 1/1995 | Wirges |
| 5,407,130 A | 4/1995 | Uyeki et al. |
| 5,408,965 A | 4/1995 | Fulton et al. |
| 5,422,822 A | 6/1995 | Toyota et al. |
| 5,461,568 A | 10/1995 | Morita |
| 5,528,148 A | 6/1996 | Rogers |
| 5,531,285 A | 7/1996 | Green |
| 5,546,901 A | 8/1996 | Acker et al. |
| 5,549,153 A | 8/1996 | Baruschke et al. |
| 5,550,445 A | 8/1996 | Nii |
| 5,558,057 A | 9/1996 | Everts |
| 5,586,613 A | 12/1996 | Ehsani |
| 5,614,809 A | 3/1997 | Kiuchi et al. |
| 5,621,304 A | 4/1997 | Kiuchi et al. |
| 5,625,558 A | 4/1997 | Togai et al. |
| 5,647,534 A | 7/1997 | Kelz et al. |
| 5,673,668 A | 10/1997 | Pallett et al. |
| 5,738,062 A | 4/1998 | Everts et al. |
| 5,788,597 A | 8/1998 | Boll et al. |
| 5,804,935 A | 9/1998 | Radev |
| 5,842,732 A | 12/1998 | Daggett |
| 5,860,403 A | 1/1999 | Hirano et al. |
| 5,867,009 A | 2/1999 | Kiuchi et al. |
| 5,883,496 A | 3/1999 | Esaki et al. |
| 5,947,075 A | 9/1999 | Ryu et al. |
| 5,950,590 A | 9/1999 | Everts et al. |
| 5,954,364 A | 9/1999 | Nechushtan |
| 5,960,764 A | 10/1999 | Araki |
| 5,960,901 A | 10/1999 | Hanagan |
| 5,971,290 A | 10/1999 | Echigoya et al. |
| 6,019,183 A | 2/2000 | Shimasaki et al. |
| 6,030,316 A | 2/2000 | Kadota |
| 6,041,877 A | 3/2000 | Yamada et al. |
| 6,047,678 A | 4/2000 | Kurihara et al. |
| 6,114,784 A | 9/2000 | Nakano |
| 6,119,636 A | 9/2000 | Fan |
| 6,152,098 A | 11/2000 | Becker et al. |
| 6,178,947 B1 | 1/2001 | Machida et al. |
| 6,184,603 B1 | 2/2001 | Hamai et al. |
| 6,196,168 B1 | 3/2001 | Eckerskorn et al. |
| 6,198,183 B1 | 3/2001 | Baeumel et al. |
| 6,209,518 B1 | 4/2001 | Machida et al. |
| 6,213,079 B1 | 4/2001 | Watanabe |
| 6,213,081 B1 | 4/2001 | Ryu et al. |
| 6,216,660 B1 | 4/2001 | Ryu et al. |
| 6,217,758 B1 | 4/2001 | Lee |
| 6,227,160 B1 | 5/2001 | Kurihara et al. |
| 6,276,331 B1 | 8/2001 | Machida et al. |
| 6,293,604 B1 | 9/2001 | Williams et al. |
| 6,328,004 B1 | 12/2001 | Rynhart |
| 6,332,504 B1 | 12/2001 | Adds |
| 6,333,620 B1 | 12/2001 | Schmitz et al. |
| 6,334,364 B1 | 1/2002 | Suzuki |
| 6,350,204 B1 | 2/2002 | Yasui et al. |
| 6,353,786 B1 | 3/2002 | Yamada et al. |
| 6,359,344 B1 | 3/2002 | Klein et al. |
| 6,362,602 B1 | 3/2002 | Kozarekar |
| 6,371,878 B1 | 4/2002 | Bowen |
| 6,394,061 B2 | 5/2002 | Ryu et al. |
| 6,397,795 B2 | 6/2002 | Hare |
| 6,427,797 B1 | 8/2002 | Chang |
| 6,467,286 B2 | 10/2002 | Hasebe et al. |
| 6,488,108 B1 | 12/2002 | Boll |
| 6,504,259 B1 | 1/2003 | Kuroda et al. |
| 6,510,829 B2 | 1/2003 | Ito et al. |
| 6,513,492 B1 | 2/2003 | Bauerle et al. |
| 6,520,133 B1 | 2/2003 | Wenger et al. |
| RE38,012 E | 3/2003 | Ochab et al. |
| 6,528,918 B2 | 3/2003 | Paulus-Neues et al. |
| 6,557,515 B2 | 5/2003 | Furuya et al. |
| 6,557,922 B1 | 5/2003 | Hommel |
| 6,561,315 B2 | 5/2003 | Furuya et al. |
| 6,591,896 B1 | 7/2003 | Hansen |
| 6,615,946 B2 | 9/2003 | Pasquini et al. |
| 6,622,804 B2 | 9/2003 | Schmitz et al. |
| 6,640,766 B2 | 11/2003 | Furuya et al. |
| 6,661,108 B1 | 12/2003 | Yamada et al. |
| 6,675,562 B2 | 1/2004 | Lawrence |
| 6,682,436 B2 | 1/2004 | Kimoto et al. |
| 6,692,365 B2 | 2/2004 | Suzuki et al. |
| 6,702,052 B1 | 3/2004 | Wakashiro et al. |
| 6,769,391 B1 | 8/2004 | Lee et al. |
| 6,777,846 B2 | 8/2004 | Feldner et al. |
| 6,786,187 B2 | 9/2004 | Nagai et al. |
| 6,809,429 B1 | 10/2004 | Frank |
| 6,810,977 B2 | 11/2004 | Suzuki |
| 6,820,583 B2 | 11/2004 | Maier |
| 6,822,353 B2 | 11/2004 | Koga et al. |
| 6,825,573 B2 | 11/2004 | Suzuki et al. |
| 6,837,325 B2 | 1/2005 | Shimizu |
| 6,886,531 B1 | 5/2005 | Kawakami et al. |
| 6,899,162 B2 | 5/2005 | Hohl et al. |
| 6,909,200 B2 | 6/2005 | Bouchon |
| 6,915,770 B2 | 7/2005 | Lu |
| 6,930,405 B2 | 8/2005 | Gunji |
| 6,935,297 B2 | 8/2005 | Honda et al. |
| 6,954,045 B2 | 10/2005 | Nishikawa et al. |
| 6,966,803 B2 | 11/2005 | Hara et al. |
| 7,004,134 B2 | 2/2006 | Higuchi |
| 7,017,542 B2 | 3/2006 | Wilton et al. |
| 7,036,616 B1 | 5/2006 | Kejha |
| 7,055,454 B1 | 6/2006 | Whiting et al. |
| 7,073,482 B2 | 7/2006 | Kirchberger |
| 7,100,562 B2 | 9/2006 | Terada et al. |
| 7,104,242 B2 | 9/2006 | Nishi et al. |
| 7,108,091 B2 | 9/2006 | Guidry et al. |
| 7,114,585 B2 | 10/2006 | Man et al. |
| 7,134,517 B1 | 11/2006 | Kaiser et al. |
| 7,165,522 B2 | 1/2007 | Malek et al. |
| 7,191,855 B2 | 3/2007 | Vasilantone |
| 7,204,219 B2 | 4/2007 | Sakurai |
| 7,208,847 B2 | 4/2007 | Taniguchi |
| 7,216,943 B2 | 5/2007 | Nishikawa et al. |
| 7,224,132 B2 | 5/2007 | Cho et al. |
| 7,243,632 B2 | 7/2007 | Hu |
| 7,258,183 B2 | 8/2007 | Leonardi et al. |
| 7,287,508 B2 | 10/2007 | Kurihara |

(56) References Cited

U.S. PATENT DOCUMENTS

| | | |
|---|---|---|
| 7,325,526 B2 | 2/2008 | Kawamoto |
| 7,380,621 B2 | 6/2008 | Yoshida |
| 7,389,837 B2 | 6/2008 | Tamai et al. |
| 7,395,804 B2 | 7/2008 | Takemoto et al. |
| 7,412,310 B2 | 8/2008 | Brigham et al. |
| 7,424,926 B2 | 9/2008 | Tsuchiya |
| 7,449,793 B2 | 11/2008 | Cho et al. |
| 7,451,808 B2 | 11/2008 | Busse et al. |
| 7,455,134 B2 | 11/2008 | Severinsky et al. |
| 7,472,766 B2 | 1/2009 | Yamamoto et al. |
| 7,497,285 B1 | 3/2009 | Radev |
| 7,497,286 B2 | 3/2009 | Keller et al. |
| 7,533,754 B2 | 5/2009 | Burrows et al. |
| 7,537,070 B2 | 5/2009 | Maslov et al. |
| 7,560,882 B2 | 7/2009 | Clark et al. |
| 7,572,201 B2 | 8/2009 | Supina et al. |
| 7,641,584 B1 | 1/2010 | Belloso |
| 7,647,994 B1 | 1/2010 | Belloso |
| 7,699,737 B2 | 4/2010 | Berhan |
| 7,715,968 B2 | 5/2010 | Mori |
| 7,740,092 B2 | 6/2010 | Bender |
| 7,747,363 B1 | 6/2010 | Tang |
| 7,762,366 B2 | 7/2010 | Janson |
| 7,769,505 B2 | 8/2010 | Rask et al. |
| 7,775,311 B1 | 8/2010 | Hardy et al. |
| 7,780,562 B2 | 8/2010 | King et al. |
| 7,832,513 B2 | 11/2010 | Verbrugge et al. |
| 7,832,514 B2 | 11/2010 | Janson |
| 7,834,582 B2 | 11/2010 | Luan et al. |
| 7,871,348 B2 | 1/2011 | Perkins |
| 7,874,605 B2 | 1/2011 | Smith et al. |
| 7,884,574 B2 | 2/2011 | Fukumura et al. |
| 7,913,782 B1 | 3/2011 | Foss et al. |
| 7,921,945 B2 | 4/2011 | Harris |
| 7,992,662 B2 | 8/2011 | King et al. |
| 7,994,745 B2 | 8/2011 | Fujino et al. |
| 8,007,401 B2 | 8/2011 | Saito et al. |
| 8,011,461 B2 | 9/2011 | Rodriguez et al. |
| 8,033,954 B2 | 10/2011 | Theobald et al. |
| 8,035,247 B2 | 10/2011 | Ichikawa |
| 8,038,573 B2 | 10/2011 | Kozub et al. |
| 8,039,976 B2 | 10/2011 | Sato et al. |
| 8,042,993 B2 | 10/2011 | Van Maanen |
| 8,047,451 B2 | 11/2011 | Mcnaughton |
| 8,050,851 B2 | 11/2011 | Aoki et al. |
| 8,074,753 B2 | 12/2011 | Tahara et al. |
| 8,075,436 B2 | 12/2011 | Bachmann |
| 8,182,393 B2 | 5/2012 | Gillingham et al. |
| 8,215,427 B2 | 7/2012 | Rouaud et al. |
| 8,256,549 B2 | 9/2012 | Crain et al. |
| 8,269,457 B2 | 9/2012 | Wenger et al. |
| 8,302,724 B2 | 11/2012 | Gillingham et al. |
| 8,323,147 B2 | 12/2012 | Wenger et al. |
| 8,353,265 B2 | 1/2013 | Pursifull |
| 8,356,472 B2 | 1/2013 | Hiranuma et al. |
| 8,386,109 B2 | 2/2013 | Nicholls |
| 8,387,594 B2 | 3/2013 | Wenger et al. |
| 8,393,551 B2 | 3/2013 | Nemesh et al. |
| 8,449,048 B2 | 5/2013 | Bourqui et al. |
| 8,464,827 B2 | 6/2013 | Tsumiyama et al. |
| 8,480,538 B2 | 7/2013 | Gillingham et al. |
| 8,496,079 B2 | 7/2013 | Wenger et al. |
| 8,555,851 B2 | 10/2013 | Wenger et al. |
| 8,567,540 B2 | 10/2013 | Janson |
| 8,567,541 B2 | 10/2013 | Wenger et al. |
| 8,597,145 B2 | 12/2013 | Stuart |
| 8,662,239 B2 | 3/2014 | Takagi |
| 8,701,523 B2 | 4/2014 | Zerbato et al. |
| 8,703,311 B2 | 4/2014 | Sawaguchi et al. |
| 8,714,289 B2 | 5/2014 | Olsen et al. |
| 8,742,701 B2 | 6/2014 | Sujan et al. |
| 8,783,396 B2 | 7/2014 | Bowman |
| 8,851,153 B2 | 10/2014 | Park et al. |
| 8,878,469 B2 | 11/2014 | Zerbato et al. |
| 8,936,120 B2 | 1/2015 | Takagi |
| 8,958,965 B2 | 2/2015 | Perkins et al. |
| 8,991,283 B2 | 3/2015 | Fuechtner |
| 8,998,253 B2 | 4/2015 | Novotny et al. |
| 9,038,754 B2 | 5/2015 | Takagi |
| 9,096,133 B2 | 8/2015 | Kohler et al. |
| 9,096,207 B2 | 8/2015 | Madurai et al. |
| 9,108,615 B2 | 8/2015 | Lee et al. |
| 9,126,581 B2 | 9/2015 | Swales et al. |
| 9,145,136 B2 | 9/2015 | Suntharalingam et al. |
| 9,162,558 B2 | 10/2015 | Stenberg et al. |
| 9,187,083 B2 | 11/2015 | Wenger et al. |
| 9,216,637 B2 | 12/2015 | Crain et al. |
| 9,598,067 B2 | 3/2017 | Chimner et al. |
| D786,133 S | 5/2017 | Song et al. |
| 9,643,490 B2 | 5/2017 | Gassmann et al. |
| 9,650,032 B2 | 5/2017 | Kotloski et al. |
| 9,695,932 B2 | 7/2017 | Lee et al. |
| 9,718,355 B2 | 8/2017 | Osborn et al. |
| 9,738,272 B2 | 8/2017 | West et al. |
| 9,776,625 B2 | 10/2017 | Yukawa |
| 9,802,605 B2 | 10/2017 | Wenger et al. |
| 9,884,647 B2 | 2/2018 | Peterson et al. |
| 10,040,441 B2 | 8/2018 | Fuchtner et al. |
| 10,046,617 B2 | 8/2018 | Smith et al. |
| 10,118,477 B2 | 11/2018 | Borud et al. |
| 10,744,868 B2 | 8/2020 | Borud et al. |
| 11,724,580 B2 | 8/2023 | Jo |
| 11,987,288 B2 | 5/2024 | Thomas et al. |
| 2001/0011051 A1 | 8/2001 | Hattori et al. |
| 2001/0020554 A1 | 9/2001 | Yanase et al. |
| 2001/0039938 A1 | 11/2001 | Machida et al. |
| 2001/0043808 A1 | 11/2001 | Matsunaga et al. |
| 2002/0011100 A1 | 1/2002 | Pursifull |
| 2002/0043413 A1 | 4/2002 | Kimishima et al. |
| 2002/0074177 A1 | 6/2002 | Pasquini et al. |
| 2002/0094908 A1 | 7/2002 | Urasawa et al. |
| 2002/0104704 A1 | 8/2002 | Chang |
| 2002/0179354 A1 | 12/2002 | White |
| 2003/0034187 A1 | 2/2003 | Hisada et al. |
| 2003/0070849 A1 | 4/2003 | Whittaker |
| 2003/0104900 A1 | 6/2003 | Takahashi et al. |
| 2003/0162631 A1 | 8/2003 | Williams |
| 2003/0226653 A1 | 12/2003 | Takedomi et al. |
| 2004/0002808 A1 | 1/2004 | Hashimoto et al. |
| 2004/0031451 A1 | 2/2004 | Atschreiter et al. |
| 2004/0063535 A1 | 4/2004 | Ibaraki |
| 2004/0079569 A1 | 4/2004 | Awakawa |
| 2004/0130224 A1 | 7/2004 | Mogi et al. |
| 2004/0134698 A1 | 7/2004 | Yamamoto et al. |
| 2004/0159183 A1 | 8/2004 | Sakamoto et al. |
| 2004/0168455 A1 | 9/2004 | Nakamura |
| 2004/0177827 A1 | 9/2004 | Hoyte et al. |
| 2004/0226761 A1 | 11/2004 | Takenaka et al. |
| 2005/0052080 A1 | 3/2005 | Maslov et al. |
| 2005/0055140 A1 | 3/2005 | Brigham et al. |
| 2005/0079953 A1 | 4/2005 | Zieles et al. |
| 2005/0107200 A1 | 5/2005 | Yamazaki et al. |
| 2005/0115748 A1 | 6/2005 | Lanier |
| 2005/0279539 A1 | 12/2005 | Chiou et al. |
| 2006/0027618 A1 | 2/2006 | Williams |
| 2006/0066106 A1 | 3/2006 | Yang et al. |
| 2006/0073929 A1 | 4/2006 | Porter |
| 2006/0080986 A1 | 4/2006 | Inoue |
| 2006/0112695 A1 | 6/2006 | Neubauer et al. |
| 2006/0130888 A1 | 6/2006 | Yamaguchi et al. |
| 2006/0162973 A1 | 7/2006 | Harris et al. |
| 2006/0169507 A1 | 8/2006 | Inoue et al. |
| 2006/0231304 A1 | 10/2006 | Severinsky et al. |
| 2007/0027609 A1 | 2/2007 | Watanabe |
| 2007/0050095 A1 | 3/2007 | Nelson et al. |
| 2007/0080006 A1 | 4/2007 | Yamaguchi |
| 2007/0114080 A1 | 5/2007 | Kaiser et al. |
| 2007/0114081 A1 | 5/2007 | Iwanaka et al. |
| 2007/0144800 A1 | 6/2007 | Stone |
| 2007/0193793 A1 | 8/2007 | Burrows et al. |
| 2007/0251742 A1 | 11/2007 | Adams et al. |
| 2007/0259747 A1 | 11/2007 | Thomas et al. |
| 2008/0022981 A1 | 1/2008 | Keyaki et al. |
| 2008/0060866 A1 | 3/2008 | Worman |

(56) References Cited

U.S. PATENT DOCUMENTS

| | | |
|---|---|---|
| 2008/0083392 A1 | 4/2008 | Kurihara et al. |
| 2008/0121443 A1 | 5/2008 | Clark et al. |
| 2008/0157592 A1 | 7/2008 | Bax et al. |
| 2008/0178830 A1 | 7/2008 | Sposato |
| 2008/0184978 A1 | 8/2008 | Sagawa et al. |
| 2008/0185199 A1 | 8/2008 | Kimura et al. |
| 2008/0202483 A1 | 8/2008 | Procknow |
| 2008/0236920 A1 | 10/2008 | Swindell et al. |
| 2008/0257625 A1 | 10/2008 | Stranges |
| 2008/0271937 A1 | 11/2008 | King et al. |
| 2008/0299448 A1 | 12/2008 | Buck et al. |
| 2008/0308334 A1 | 12/2008 | Leonard et al. |
| 2009/0000849 A1 | 1/2009 | Leonard et al. |
| 2009/0014223 A1 | 1/2009 | Jones et al. |
| 2009/0014246 A1 | 1/2009 | Lin |
| 2009/0015023 A1 | 1/2009 | Fleckner |
| 2009/0054190 A1 | 2/2009 | Kim et al. |
| 2009/0064642 A1 | 3/2009 | Sato et al. |
| 2009/0065279 A1 | 3/2009 | Bessho et al. |
| 2009/0071737 A1 | 3/2009 | Leonard et al. |
| 2009/0071739 A1 | 3/2009 | Leonard et al. |
| 2009/0079384 A1 | 3/2009 | Harris |
| 2009/0090573 A1 | 4/2009 | Boone |
| 2009/0091101 A1 | 4/2009 | Leonard et al. |
| 2009/0091137 A1 | 4/2009 | Nishida et al. |
| 2009/0121518 A1 | 5/2009 | Leonard et al. |
| 2009/0143929 A1 | 6/2009 | Eberhard et al. |
| 2009/0177345 A1 | 7/2009 | Severinsky et al. |
| 2009/0179509 A1 | 7/2009 | Gerundt et al. |
| 2009/0183938 A1 | 7/2009 | Cover et al. |
| 2009/0256415 A1 | 10/2009 | Bourqui et al. |
| 2009/0301830 A1 | 12/2009 | Kinsman et al. |
| 2009/0302590 A1 | 12/2009 | Van et al. |
| 2009/0314462 A1 | 12/2009 | Yahia et al. |
| 2009/0321156 A1 | 12/2009 | Perkins |
| 2010/0012412 A1 | 1/2010 | Deckard et al. |
| 2010/0019722 A1 | 1/2010 | Sanchez |
| 2010/0029450 A1 | 2/2010 | Ward |
| 2010/0060015 A1 | 3/2010 | Buker |
| 2010/0065344 A1 | 3/2010 | Collings, III |
| 2010/0090657 A1 | 4/2010 | Fazakas |
| 2010/0090797 A1 | 4/2010 | Koenig et al. |
| 2010/0096199 A1 | 4/2010 | Raynor |
| 2010/0121512 A1 | 5/2010 | Takahashi et al. |
| 2010/0131134 A1 | 5/2010 | Wallace |
| 2010/0147606 A1 | 6/2010 | Kalenborn et al. |
| 2010/0155170 A1* | 6/2010 | Melvin ............... F16H 57/0489 180/339 |
| 2010/0162989 A1 | 7/2010 | Aamand et al. |
| 2010/0193269 A1 | 8/2010 | Fuchtner et al. |
| 2010/0211242 A1 | 8/2010 | Kelty et al. |
| 2010/0300646 A1 | 12/2010 | Sawaguchi et al. |
| 2010/0314182 A1 | 12/2010 | Crain et al. |
| 2010/0314183 A1 | 12/2010 | Olsen et al. |
| 2010/0314184 A1 | 12/2010 | Stenberg et al. |
| 2010/0317484 A1 | 12/2010 | Gillingham et al. |
| 2010/0317485 A1 | 12/2010 | Gillingham et al. |
| 2010/0320959 A1 | 12/2010 | Tomberlin et al. |
| 2011/0011665 A1 | 1/2011 | Peterson et al. |
| 2011/0036658 A1 | 2/2011 | Cantemir et al. |
| 2011/0048821 A1 | 3/2011 | Dial |
| 2011/0061961 A1 | 3/2011 | Liu et al. |
| 2011/0079454 A1 | 4/2011 | Maguire et al. |
| 2011/0094225 A1 | 4/2011 | Kistner et al. |
| 2011/0139521 A1 | 6/2011 | Ichikawa |
| 2011/0147106 A1 | 6/2011 | Wenger et al. |
| 2011/0148184 A1 | 6/2011 | Suzuki et al. |
| 2011/0174561 A1 | 7/2011 | Bowman |
| 2011/0200860 A1 | 8/2011 | Brodie et al. |
| 2011/0226539 A1 | 9/2011 | Huss et al. |
| 2011/0276241 A1 | 11/2011 | Nakao |
| 2012/0125022 A1 | 5/2012 | Maybury et al. |
| 2012/0209463 A1 | 8/2012 | Gibbs et al. |
| 2012/0215392 A1 | 8/2012 | Hashimoto |
| 2012/0241129 A1 | 9/2012 | Kohl et al. |
| 2013/0006458 A1 | 1/2013 | Bhattarai et al. |
| 2013/0048396 A1 | 2/2013 | Neilson |
| 2013/0060410 A1 | 3/2013 | Crain et al. |
| 2013/0066496 A1 | 3/2013 | Ishii |
| 2013/0256050 A1 | 10/2013 | Novotny et al. |
| 2014/0144719 A1 | 5/2014 | Morgan et al. |
| 2014/0335995 A1 | 11/2014 | Swales et al. |
| 2015/0224867 A1 | 8/2015 | Nett et al. |
| 2015/0375803 A1 | 12/2015 | Raska |
| 2016/0024827 A1 | 1/2016 | Lambright et al. |
| 2016/0129803 A1 | 5/2016 | Grewal et al. |
| 2016/0185216 A1 | 6/2016 | Clarke et al. |
| 2016/0207418 A1 | 7/2016 | Bergstrom et al. |
| 2016/0229392 A1 | 8/2016 | Sugitani et al. |
| 2016/0355086 A1 | 12/2016 | Ogawa et al. |
| 2017/0120899 A1 | 5/2017 | Sugimoto et al. |
| 2017/0166052 A1 | 6/2017 | Ogawa et al. |
| 2017/0232866 A1 | 8/2017 | Sugizaki et al. |
| 2017/0355259 A1 | 12/2017 | Borud et al. |
| 2018/0154765 A1 | 6/2018 | Oyama et al. |
| 2018/0251019 A1 | 9/2018 | Stoltz |
| 2018/0252315 A1 | 9/2018 | Rippelmeyer et al. |
| 2019/0031015 A1 | 1/2019 | Borud et al. |
| 2019/0275885 A1 | 9/2019 | Hurd et al. |
| 2020/0324658 A1 | 10/2020 | Borud |
| 2020/0361273 A1 | 11/2020 | Borud et al. |
| 2022/0305872 A1 | 9/2022 | Bracht |
| 2022/0371456 A1 | 11/2022 | Borud et al. |

FOREIGN PATENT DOCUMENTS

| | | |
|---|---|---|
| CA | 2764399 A1 | 12/2010 |
| CA | 2972374 A1 | 12/2010 |
| CA | 2773214 A1 | 3/2011 |
| CN | 1268997 | 10/2000 |
| CN | 201211849 Y | 3/2009 |
| CN | 101701547 A | 5/2010 |
| CN | 101708694 A | 5/2010 |
| CN | 102802981 A | 11/2012 |
| CN | 103153667 A | 6/2013 |
| CN | 105517670 A | 4/2016 |
| CN | 303870043 S | 9/2016 |
| CN | 106314118 A | 1/2017 |
| CN | 107207055 A | 9/2017 |
| DE | 3825349 A1 | 2/1989 |
| DE | 4427322 A1 | 2/1996 |
| DE | 4447138 | 12/1997 |
| DE | 19735021 A1 | 2/1999 |
| DE | 102005003077 A1 | 8/2006 |
| DE | 102007024126 | 12/2008 |
| DE | 102011102265 A1 | 4/2012 |
| DE | 602010052770 | 8/2018 |
| EM | 002962258-0001 | 1/2016 |
| EM | 002962258-0002 | 1/2016 |
| EP | 0511654 A2 | 11/1992 |
| EP | 0856427 A1 | 8/1998 |
| EP | 0898352 A1 | 2/1999 |
| EP | 1205331 A2 | 5/2002 |
| EP | 1382475 A1 | 1/2004 |
| EP | 2145808 A1 | 1/2010 |
| EP | 2266855 A1 | 12/2010 |
| EP | 2567846 A2 | 3/2013 |
| EP | 3247617 A2 | 11/2017 |
| EP | 3403862 | 11/2018 |
| FR | 2941424 A1 | 7/2010 |
| GB | 2349483 A | 11/2000 |
| GB | 2431704 A | 5/2007 |
| GB | 2452062 A | 2/2009 |
| GB | 2454349 A | 5/2009 |
| JP | 58-126434 | 7/1983 |
| JP | 59-039933 A | 3/1984 |
| JP | 60-209616 A | 10/1985 |
| JP | 61-135910 | 6/1986 |
| JP | 09-095149 A | 4/1997 |
| JP | 2005-130629 A | 5/2005 |
| JP | 2005-299469 A | 10/2005 |
| JP | 2007-064080 A | 3/2007 |
| JP | 2007-278228 A | 10/2007 |
| JP | 2009-101723 A | 5/2009 |

(56) References Cited

FOREIGN PATENT DOCUMENTS

| | | |
|---|---|---|
| JP | 2009-173147 A | 8/2009 |
| JP | 2009-220765 A | 10/2009 |
| JP | 2009-281330 A | 12/2009 |
| JP | 2010-064744 A | 3/2010 |
| JP | 2010-155570 A | 7/2010 |
| JP | 2010-532288 A | 10/2010 |
| JP | 2016-002772 A | 1/2016 |
| KR | 10-2008-0028174 A | 3/2008 |
| MX | 332036 | 7/2015 |
| SE | 540917 C2 | 12/2018 |
| WO | 2004/067361 A1 | 8/2004 |
| WO | 2004/085194 A1 | 10/2004 |
| WO | 2008/115463 A1 | 9/2008 |
| WO | 2009/059407 A1 | 5/2009 |
| WO | 2010/015784 A1 | 2/2010 |
| WO | 2010/081979 A1 | 7/2010 |
| WO | 2010/148016 A2 | 12/2010 |
| WO | 2011/035056 A2 | 3/2011 |
| WO | 2012/022323 A1 | 2/2012 |
| WO | 2012/066226 A1 | 5/2012 |
| WO | 2012/138991 A2 | 10/2012 |
| WO | 2013/149106 A2 | 10/2013 |
| WO | 2015/052808 A1 | 4/2015 |
| WO | 2015/071904 A1 | 5/2015 |
| WO | 2016/118585 A2 | 7/2016 |
| WO | 2018/121985 A1 | 7/2018 |
| WO | 2019/039990 A1 | 2/2019 |

OTHER PUBLICATIONS

Examination Report No. 1 issued by the Australian Government IP Australia, dated Nov. 6, 2023, for Australian Patent Application No. 2022206803; 5 pages.
"Bad Boy Partners with G-Force on Project", All-Terrain Vehicles Magazine, Jan. 29, 2009, available at http://www.atvmag.com/article.asp?nid=1324, accessed on Jun. 11, 2010; 2 pages.
"Bear DC Contractor Specifications", Trombetta Tympanium, 2003, available at www.trombetta.com; 2 pages.
English translation of Decision of Rejection issued by the Japanese Patent Office, dated Oct. 7, 2020, in Japanese Patent Application No. 2018-562095; 5 pages.
Examination Report No. 1 issued by the Australian Government IP Australia, dated Jun. 13, 2019, for Australian Patent Application No. 2017284964; 3 pages.
Examination Report No. 1 issued by the Australian Patent Office, dated Sep. 23, 2021, for Australian Patent Application No. 202044550; 5 pages.
Heitner, Range extender hybrid vehicle, Intersociety Energy Conversion Engineering Conference Proceedings, vol. 4, pp. 323-338, 1991.
International Preliminary Report on Patentability issued by the European Patent Office, dated Dec. 27, 2018, for International Patent Application No. PCT/US2017/035939; 7 pages.
International Preliminary Report on Patentability issued by the European Patent Office, dated Oct. 18, 2011, for International Patent Application No. PCT/US2010/038711; 33 pages.
International Preliminary Report on Patentability issued by the European Patent Office, dated Oct. 18, 2012, for International Patent Application No. PCT/US2010/049167; 30 pages.
International Preliminary Report on Patentability issued by The International Bureau of WIPO, dated Mar. 4, 2014, for International Patent Application No. PCT/US2012/032510; 5 pages.
International Preliminary Report on Patentability issued by the International Preliminary Examining Authority, dated Sep. 9, 2021, for International Patent Application No. PCT/US2020/032342; 15 pages.
International Search Report and Written Opinion received for PCT Patent Application No. PCT/US17/35939, mailed on Sep. 14, 2017, 10 pages.
International Search Report and Written Opinion received for PCT Patent Application No. PCT/US2020/032342, mailed on Aug. 4, 2020, 10 pages.
International Search Report issued by the European Patent Office, dated Apr. 6, 2011, for International Patent Application No. PCT/US2010/038711; 6 pages.
International Search Report issued by the European Patent Office, dated Feb. 21, 2014, for International Patent Application No. PCT/US2012/032510; 5 pages.
International Search Report issued by the European Patent Office, dated Jul. 6, 2011, for International Patent Application No. PCT/US2010/049167; 6 pages.
Letter Exam Report issued by the State Intellectual Property Office (SIPO), dated Mar. 18, 2015, for Chinese Patent Application No. 201080046628.5; 20 pages.
Photograph of Bad Boy buggies (Registered) All Electric 4WD vehicle, undated; 1 page.
Photograph of Ruff & Tuff vehicle, undated; 1 page.
Research on Generator Set Control of Ranger Extender Pure Electric Vehicles, Fang, et al., Power and Energy Conference (APPEEC), 2010 Asia-Pacific, Mar. 31, 2010; 4 pages.
Search Report issued by the Japanese Patent Office, dated Dec. 4, 2019, for Japanese Patent Application No. 2018-562095; 6 pages.
Second Written Opinion of the International Preliminary Examining Authority, dated Apr. 30, 2021, for International Patent Application No. PCT/US2020/032342; 7 pages.
Written Opinion issued by the European Patent Office, dated Apr. 6, 2011, for International Patent Application No. PCT/US2010/038711; 8 pages.
Written Opinion issued by the European Patent Office, dated Feb. 21, 2014, for International Patent Application No. PCT/US2012/032510; 4 pages.
Written Opinion issued by the European Patent Office, dated Jul. 6, 2011, for International Patent Application No. PCT/US2010/049167; 5 pages.

* cited by examiner

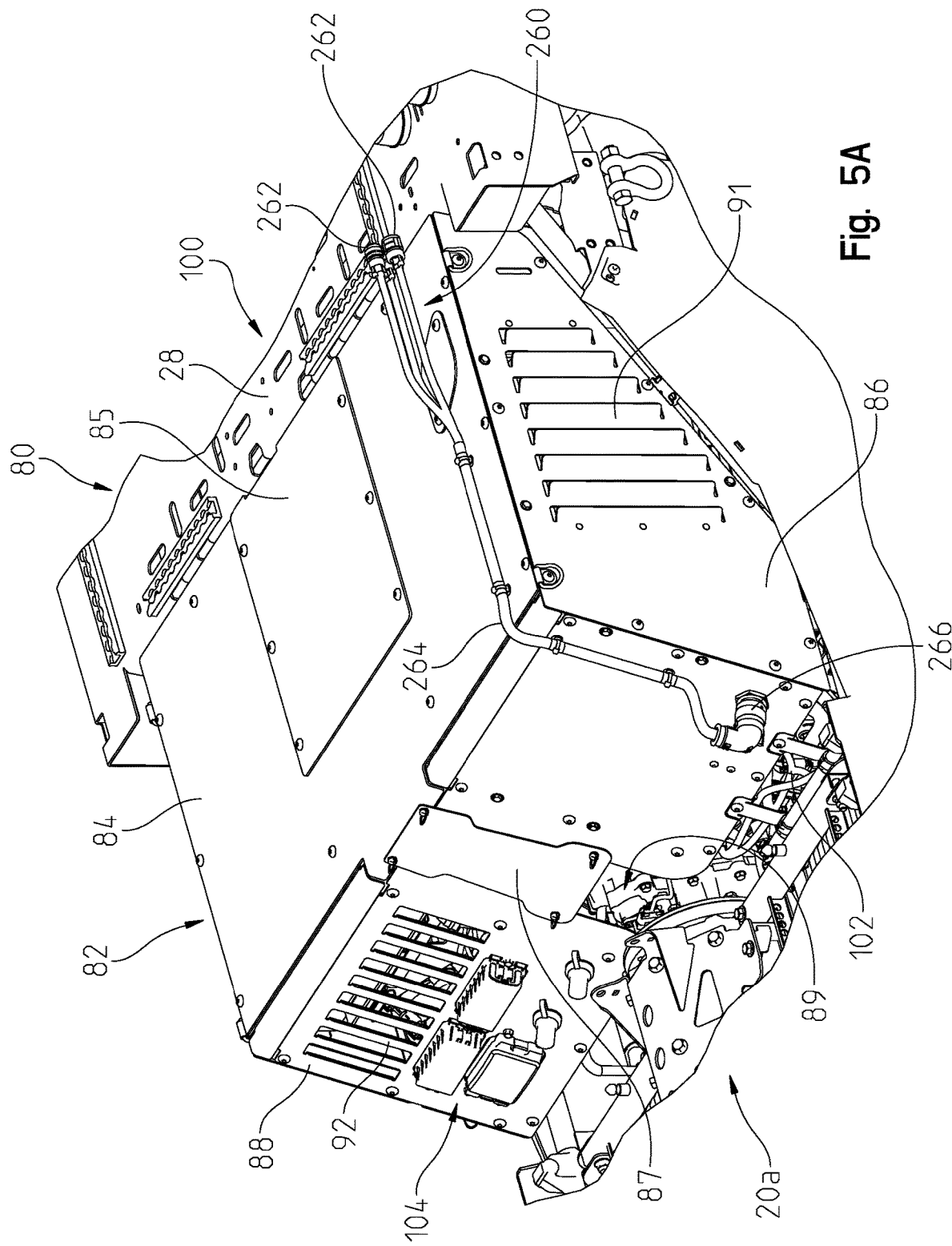

HYBRID UTILITY VEHICLE

CROSS-REFERENCE TO RELATED APPLICATIONS

The present application is a continuation of U.S. patent application Ser. No. 17/838,903, filed Jun. 13, 2022, is a continuation of U.S. patent application Ser. No. 16/414,217, filed on May 16, 2019, titled "HYBRID UTILITY VEHICLE", issued as U.S. Pat. No. 11,370,266, filed on Jun. 28, 2022, the entire disclosures of which are expressly incorporated by reference herein. The present application expressly incorporates by reference herein the complete disclosures of U.S. patent application Ser. No. 16/146,304, filed on Sep. 28, 2018, titled "HYBRID UTILITY VEHICLE"; U.S. patent application Ser. No. 15/613,483, filed on Jun. 5, 2017, titled "HYBRID UTILITY VEHICLE"; and U.S. Provisional Patent Application Ser. No. 62/349,998, filed Jun. 14, 2016, titled "HYBRID UTILITY VEHICLE".

FIELD OF THE DISCLOSURE

The present application relates to a utility vehicle and, more particularly, a hybrid utility vehicle.

BACKGROUND OF THE DISCLOSURE

Electric vehicles are known to have at least one battery pack which may be operably coupled to an electric motor for charging the battery pack and/or for driving the wheels of the vehicle. A hybrid vehicle, however, also includes an engine. The hybrid vehicle, therefore, has to ensure that both the engine, electric motor, and battery packs are sufficiently cooled. Additionally, because the vehicle must have sufficient space for supporting the battery packs, any accessories or cargo to be carried on the vehicle may be positioned at alternative locations thereon.

SUMMARY OF THE DISCLOSURE

In one embodiment, a cooling assembly for a hybrid vehicle comprises a first cooling system configured to cool an engine and a second cooling system separate from the first cooling system and configured to cool a plurality of electrical components. The second cooling system is configured with a first method of cooling at least a first electrical component and is configured with a second method of cooling at least a second electrical component. The first method of cooling is different from the second method of cooling.

In a further embodiment, a hybrid vehicle comprises a plurality of ground-engaging members; a frame assembly supported by the plurality of ground-engaging members; an operator area supported by the frame assembly and including an operator seat and a front passenger seat; an engine operably coupled to the plurality of ground-engaging members; and an electrical assembly operably coupled to at least one of the engine and the plurality of ground-engaging members. The electrical assembly includes at least one high-voltage component and at least one low-voltage component. The vehicle also comprises a cooling assembly including a first cooling system fluidly coupled to the engine and a second cooling system fluidly coupled to the electrical assembly. The second cooling system includes an air intake on a lateral side of the hybrid vehicle and the at least one low-voltage component is positioned adjacent the air intake. The second cooling systems is configured to receive ambient air through the air intake and flow the ambient air across the low-voltage and high-voltage components

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 5A is a front left perspective view of a cooling assembly and housing for electrical components of the vehicle;

Figure 1A:
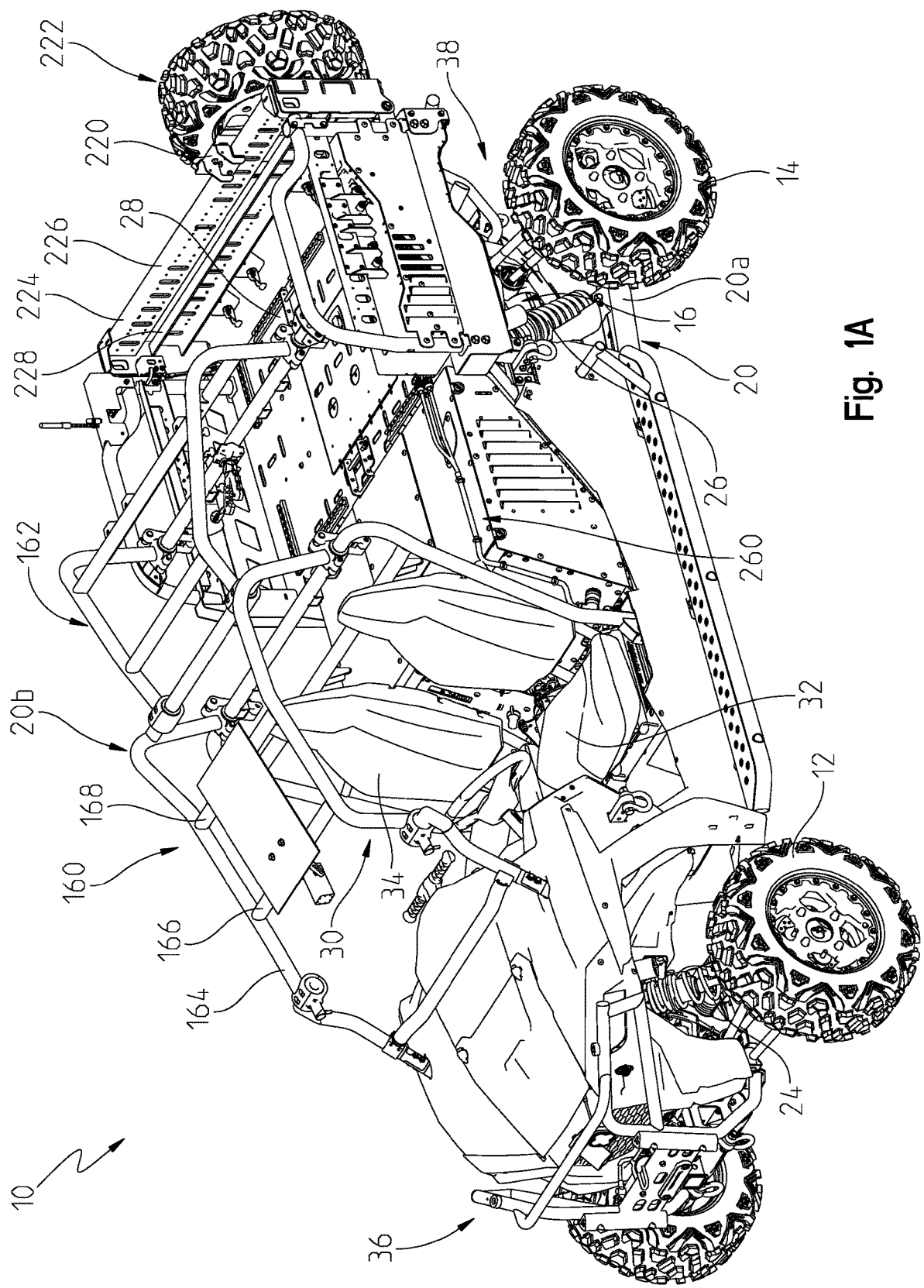
FIG. 1A is a front left perspective view of a hybrid utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Figure 1B:
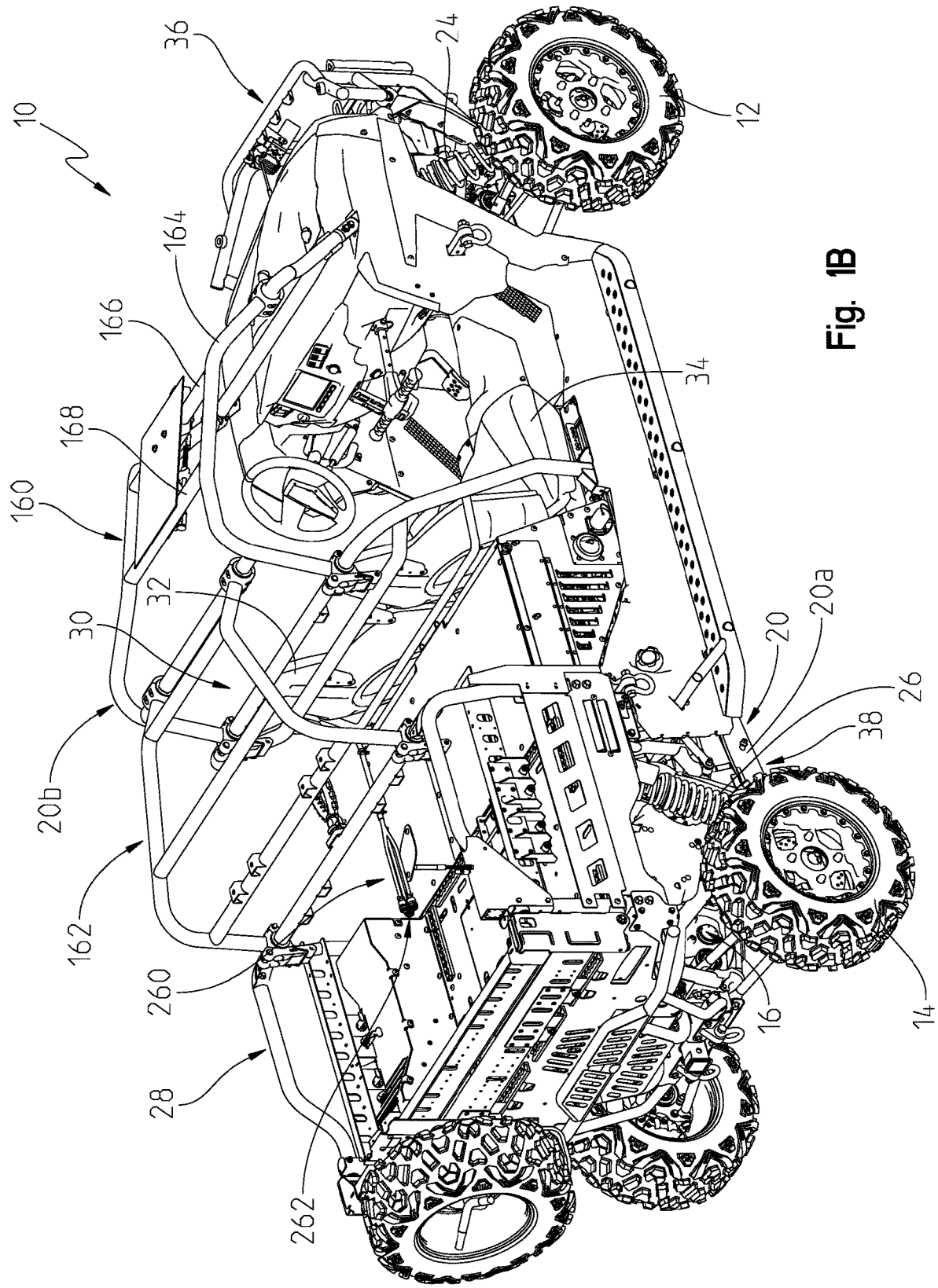
FIG. 1B is a rear right perspective of the vehicle of FIG. 1A.

Referring to FIGS. 1A and 1B, an illustrative embodiment of a hybrid utility vehicle 10 is shown, and includes ground-engaging members, including front ground-engaging members 12 and rear ground-engaging members 14, a powertrain assembly 16, a frame assembly 20, a plurality of body panels 22 coupled to frame assembly 20, a front suspension assembly 24, a rear suspension assembly 26, and a rear cargo area 28. In one embodiment, one or more ground engaging members 12, 14 may be replaced with tracks, such as the PROSPECTOR II tracks available from Polaris Industries, Inc. located at 2100 Highway 55 in Medina, Minn. 55340, or non-pneumatic tires. Vehicle 10 may be referred to as a utility vehicle ("UV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Referring still to FIGS. 1A and 1B, vehicle 10 includes an operator area 30 supported by frame assembly 20, and which includes seating for at least an operator and a passenger. Illustratively, one embodiment of vehicle 10 includes an operator seat 32 and a front passenger seat 34 in a side-by-side arrangement. Operator seat 32 includes a seat bottom, illustratively a bucket seat, and a seat back. Similarly, front passenger seat 34 includes a seat bottom, illustratively a bucket seat, and a seat back. Additionally, cargo area 28 may be configured support additional passengers and/or cargo items.

Frame assembly 20 of vehicle 10 is supported by ground engaging members 12, 14. Frame assembly 20 includes a lower frame assembly 20a and an upper frame assembly 20b. Lower frame assembly 20a includes a front frame portion 36 and a rear frame portion 38. Upper frame assembly 20b is coupled to lower frame assembly 20a and cooperates with operator area 30 to define a cab of vehicle 10.

Figure 2:
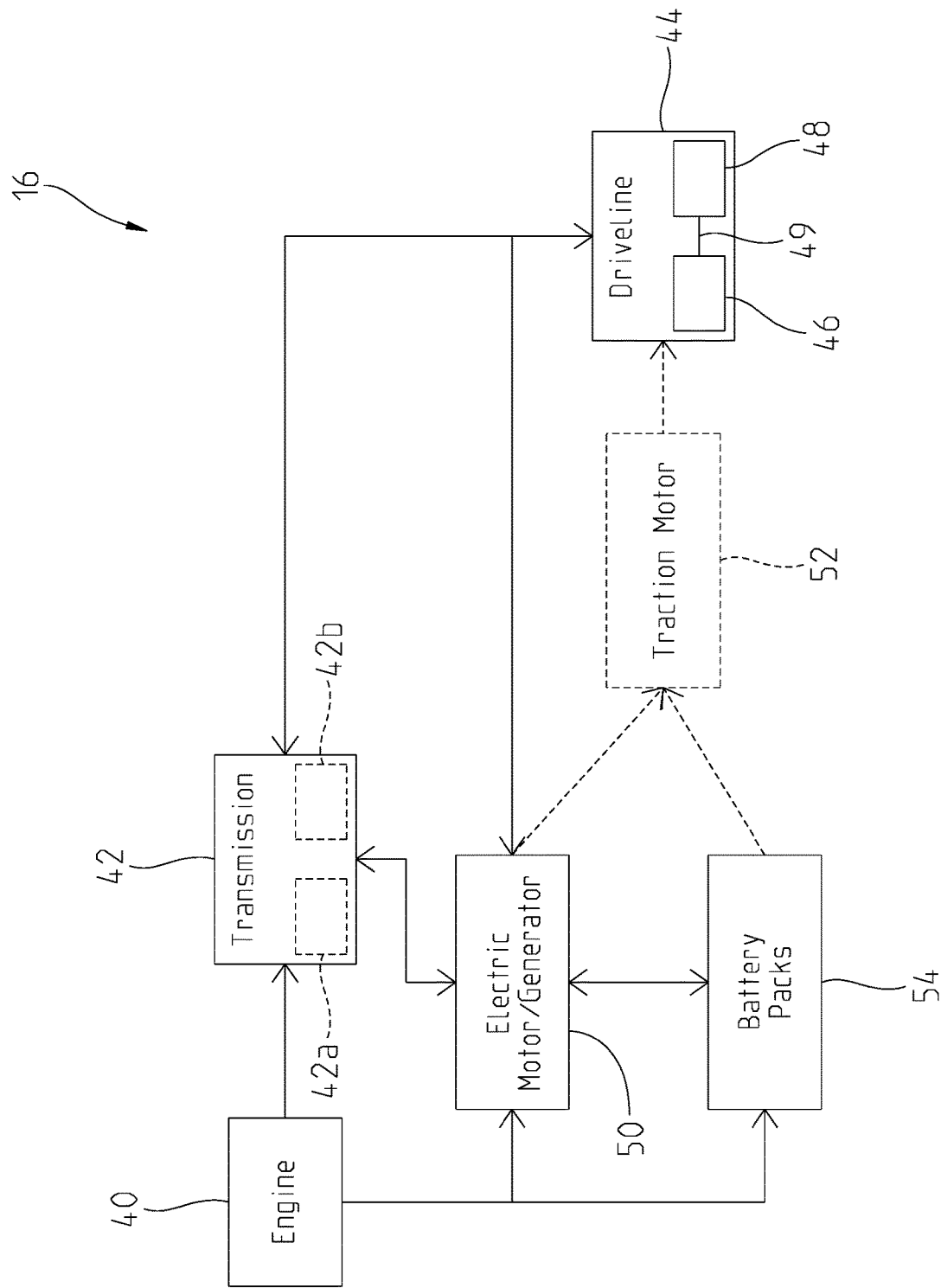
FIG. 2 is a schematic view of a drivetrain assembly of the vehicle of FIG. 1A.

Powertrain assembly 16 is operably supported on frame assembly 20 and is drivingly connected to one or more of ground engaging members 12, 14. As shown in FIG. 2, powertrain assembly 16 may include an engine 40 and a transmission 42. In one embodiment, transmission 42 may include a continuously variable transmission ("CVT") 42a and/or a shiftable transmission 42b. Engine 40 may be a fuel-burning internal combustion engine, however, any engine assembly may be contemplated, such as hybrid, fuel cell, or electric engines or units. In one embodiment, powertrain assembly 16 includes a turbocharger (not shown) and engine 40 is a diesel internal combustion engine. Additional details of CVT 42a may be disclosed in U.S. patent application Ser. No. 14/475,385, filed Sep. 2, 2014; U.S. patent application Ser. No. 15/388,106, filed Dec. 22, 2016; and U.S. patent application Ser. No. 16/357,695, filed Mar. 19, 2019, the complete disclosures of which are expressly incorporated by reference herein.

Powertrain assembly 16 also includes a driveline 44 comprised of at least a front differential 46, a rear differential 48, and a drive shaft 49 extending therebetween. Front differential 46 is operably coupled to front ground-engaging members 12 and rear differential 48 is operably coupled to rear ground-engaging members 14. Additionally, powertrain assembly 16 includes at least one electric motor/generator 50 and includes or is operably coupled to at least one battery pack 54. Optionally, powertrain assembly 16 also includes at least one traction motor 52.

Various components of powertrain assembly 16 are operably coupled to each other, as shown in FIG. 2. For example, engine 40 may be operably coupled to transmission 42, motor/generator 50, and/or battery pack(s) 54 in at least one operating or drive mode of vehicle 10. In embodiments, engine 40 may be operably coupled to driveline 44 through transmission 42. As is also shown in FIG. 2, motor/generator 50 is operably coupled to battery pack(s) 54, transmission 42, driveline 44, and/or traction motor 52. Further, if traction motor 52 is included, traction motor 52 is operably coupled to battery pack 54, motor/generator 50, and/or driveline 44. Additional details of powertrain assembly and the various operating or drive modes of vehicle 10 are disclosed in U.S. Pat. No. 10,118,477, filed Jun. 5, 2017, and issued Nov. 6, 2018, the complete disclosure of which is expressly incorporated by reference herein.

Figure 3:
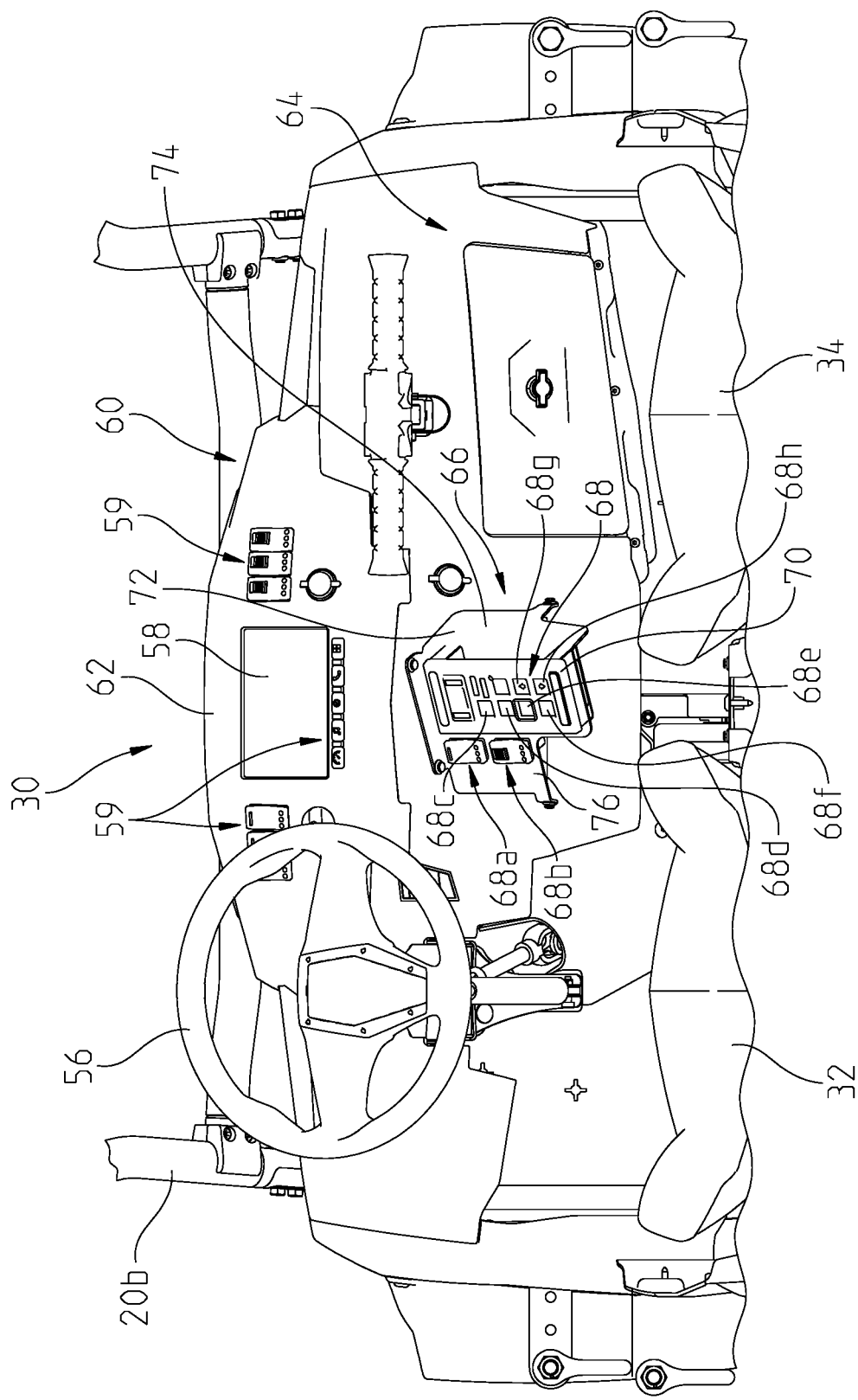
FIG. 3 is a rear elevational view of an operator area of the vehicle of FIG. 1A.

With respect to FIG. 3, operator area 30 is shown. Operator area 30 includes a plurality of operator inputs, such as a steering input 56 (e.g., a steering wheel), at least one display or gauge 58 which may be configured to transmit information to and from the operator, and a plurality of input members 59 (e.g., buttons, levers, switches, etc.) configured to allow the operator to change operating modes, conditions, parameters, etc. of vehicle 10 and/or change any other input, system, or component on vehicle 10. Display 58 and input members 59 are supported on an upper portion or member 62 of a dashboard assembly 60. Dashboard assembly 60 also may include a lower portion or member 64 thereof which extends below upper portion 62. Lower portion 64 may be integrally formed with upper portion 62 or may be removably coupled thereto with fasteners.

As shown in FIG. 3, lower portion 64 of dashboard assembly 60 may support an input console 66 which includes a plurality of input members 68 (e.g., levers, buttons, switches, etc.). Input console 66 includes a support panel 70 which is angled towards operator seat 32. More particularly, support panel 70 may include an integral mounting bracket 72 or may be removably coupled thereto. Mounting bracket 72 includes a first leg 74 which extends outwardly from lower portion 64 of dashboard assembly 60 towards a left side of vehicle 10 and includes a second leg 76 which extends outwardly from lower portion 64 towards a right side of vehicle 10. First and second legs 74, 76 may be integral with each other or may be removably coupled to each other. The configuration of first and second legs 74, 76 angles support panel 70 towards the operator seated on operator seat 32. In this way, any of input members 68 on support panel 70 are positioned toward the operator and are in close proximity to the operator for easy accessibility during operation of vehicle 10, thereby allowing the operator to keep his/her eyes on the road and not lean forward when accessing input console 66.

Certain input members 68 may define drive mode controls, including a hybrid mode and a powertrain mode for stealth and/or hybrid operation. More particularly, an input member 68a may actuate the hybrid mode which includes a combination of engine 40 and motor/generator 50 for operation of vehicle 10, whereas the stealth mode, actuated by an input member 68b, allows vehicle 10 to operate in an electric mode using only motor/generator 50. In this way, vehicle 10 operates quietly and without the sound of engine 40 when in the stealth mode. More particularly, with respect to operation in the stealth mode, and as disclosed in FIG. 4, powertrain assembly 16 and/or electrical assembly 100 includes a hybrid control unit ("HCU") 300, an engine control unit ("ECU") 302, and an engine starter 304. HCU 300 receives inputs related to the state of a key/start switch 306, the engagement or disengagement of the hybrid mode via input member 68b, and/or the engagement of disengagement of a brake pedal 308. Based on the state of key/start switch 306, input member 68b, and/or brake pedal 308, HCU 300 is configured to prevent unintentional engine starting and noises associated therewith when in the stealth mode.

When vehicle 10 operates in the stealth mode, there is a locking feature that prevents the hybrid mode from being engaged, thereby preventing the sound of the engine 40 or other components of powertrain assembly 16 from being actuated and exposing vehicle 10 to detection that would otherwise not be possible in the stealth mode. For example, and using display 58, input members 59, and/or input members 68, an override feature would have to be engaged in which the operator may be required to confirm his/her intent to exit or disengage the stealth mode or may be required to enter a code, pin, or other input when disengaging the stealth mode.

Figure 4:
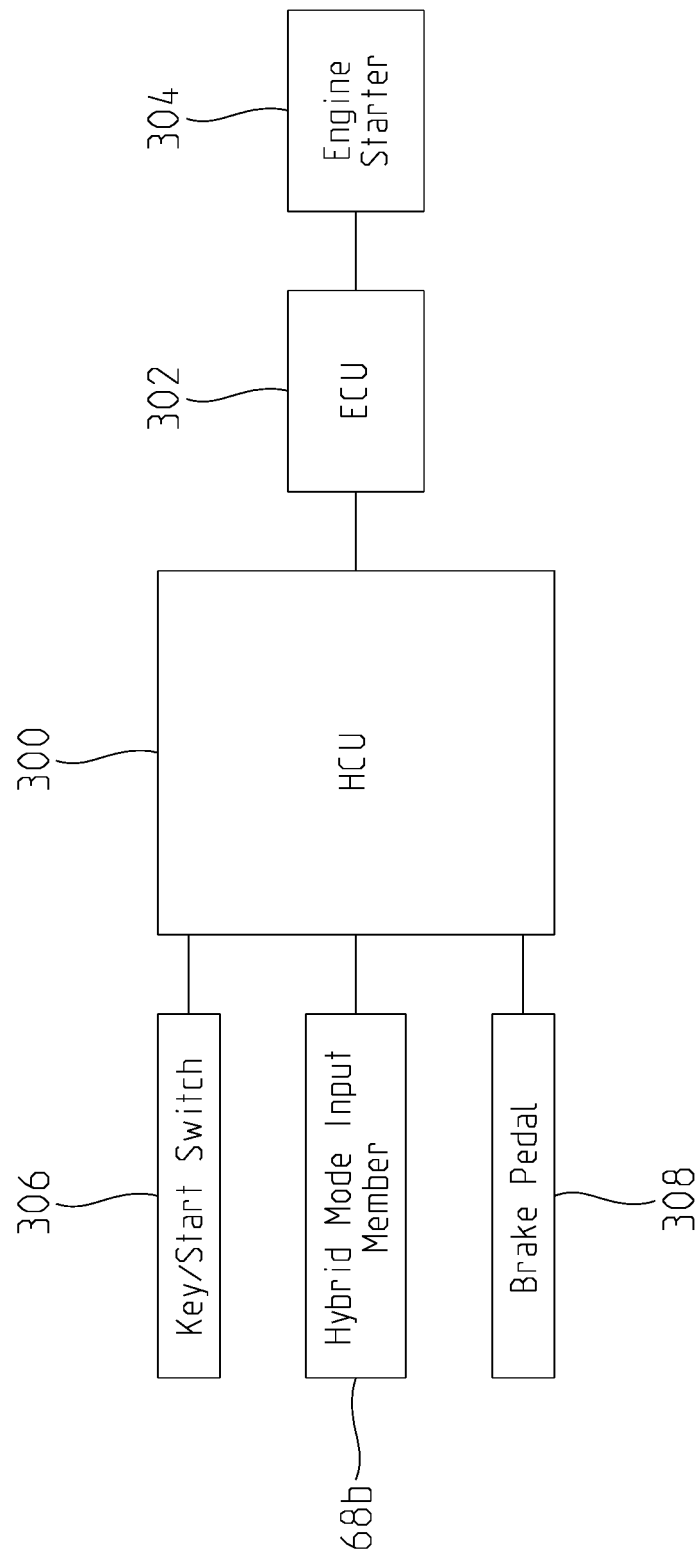
FIG. 4 is a logic diagram of a portion of the powertrain assembly and/or electrical assembly of the hybrid utility vehicle of FIG. 1A illustrating a transition from a stealth mode to a hybrid mode of operation.

However, and referring still to FIG. 4, when the operator intends to transition from the stealth mode to the hybrid mode, a plurality of intentional actions must be taken by the operator. More particularly, and as shown in FIG. 4, engine starter 304 is not connected to key/start switch 306 and, rather, all key/start switch states are wired to HCU 300, including the engine start position. In order to engage the stealth mode, the operator engages input member 68a to select the hybrid mode, engages brake pedal 308, and turns key/start switch 306 to the engine start position. In embodiments, the operator keeps his/her foot on brake pedal 308 until engine 40 cranks and fully starts. HCU 300 controls ECU 302 over CANbus communication and engine starter 304 is controlled by ECU 302.

The hybrid mode may allow the operator to choose a Hybrid Max Performance mode or a Hybrid State-of-Charge ("SOC") mode. In the Hybrid Max Performance mode, both engine 40 and traction motor 52 will provide maximum assistance during acceleration and driving while minimal power from motor/generator 50 is diverted to charge the traction batteries of vehicle 10. In the Hybrid SOC mode, maximum power is diverted to charge batteries 54 and minimal or no power is provided to traction motor 52. The intent of the Hybrid SOC mode is to allow the operator to recharge batteries 54 as quickly as possible during operation of vehicle 10. Additionally, in embodiments, certain displays, such as display 58 may include an input to actuate a Blackout mode where all visible lighting on vehicle 10 is disabled for night operations of vehicle 10.

Input console 66 also may include certain input members 68 which define a push-button selection for the gear position in an intuitive pattern from the top-left to the bottom-right: Park, Reverse, Neutral, Low, and High. Illustratively, an input member 68c may correspond to Park, an input member 68d may correspond to Reverse, and an input member 68e may correspond to Drive with input members 68g and 68h indicating High and Low, respectively. Additionally, input console 66 displays the currently-selected gear and the currently-active gear on the same display.

Referring to FIGS. 5A-11, a cooling assembly 80 for vehicle 10 is shown. Engine 40 and other mechanical components of powertrain assembly 16 may be cooled by a separate cooling system which is not shown. Rather, cooling assembly 80 of FIGS. 5A-11 is configured to cool various components of an electrical system 100 of vehicle 10. For example, and as shown in FIG. 4 and disclosed further herein, cooling assembly 80 is configured to cool battery pack 54, electrical wires or conduits 102, various electrical circuits or connections 104, and other electrical components. Illustrative cooling assembly 80 is a water-cooled system, however, cooling assembly 80 may be cooled by any other mechanism, liquid, fluid, etc.

A housing 82 for portions of cooling assembly 80 and electrical assembly 100 is comprised of at least an upper cover 84, opposing lateral side covers 86, and at least one front cover 88 removably coupled together with removable fasteners or permanently joined together, for example with welds. In embodiments, a recess 89 is defined along a portion of front cover 88 to allow various components of vehicle 10, such as drive shaft 49 or other components of powertrain assembly 16 to be positioned within a portion of housing 82.

Right side cover 86 may include at least one grouping openings and corresponding louvers 90 configured to direct air within housing 82 and left side cover 86 includes a grouping of openings and corresponding louvers 91 which expel air from housing 82. Additionally, front cover 88 may include at least one grouping of openings and louvers 92 configured to direct air within housing 82. In this way, the openings and louvers 90, 92 define air intake locations of housing 82 and cooling assembly 80 and openings and louvers 92 define an air outlet of housing 82. More particularly, and as shown best in FIG. 6, ambient air A is configured to flow into housing 82 through the air intake on right side cover 86 and through the air intake on front cover 88. The angle of louvers 90, 92 directs air A laterally through housing 82 such that air A flows from the right side of housing 82 toward the left side of housing 82. In this way, cool, ambient air A flows into housing 82 and flows across battery pack 54 and any other electrical components within housing 82 to cool such components through convection. After flowing through housing 82, air A, which has been warmed by the electrical components within housing 82, flows out of housing 82 through openings and louvers 91 on left side cover 86.

Figure 5B:
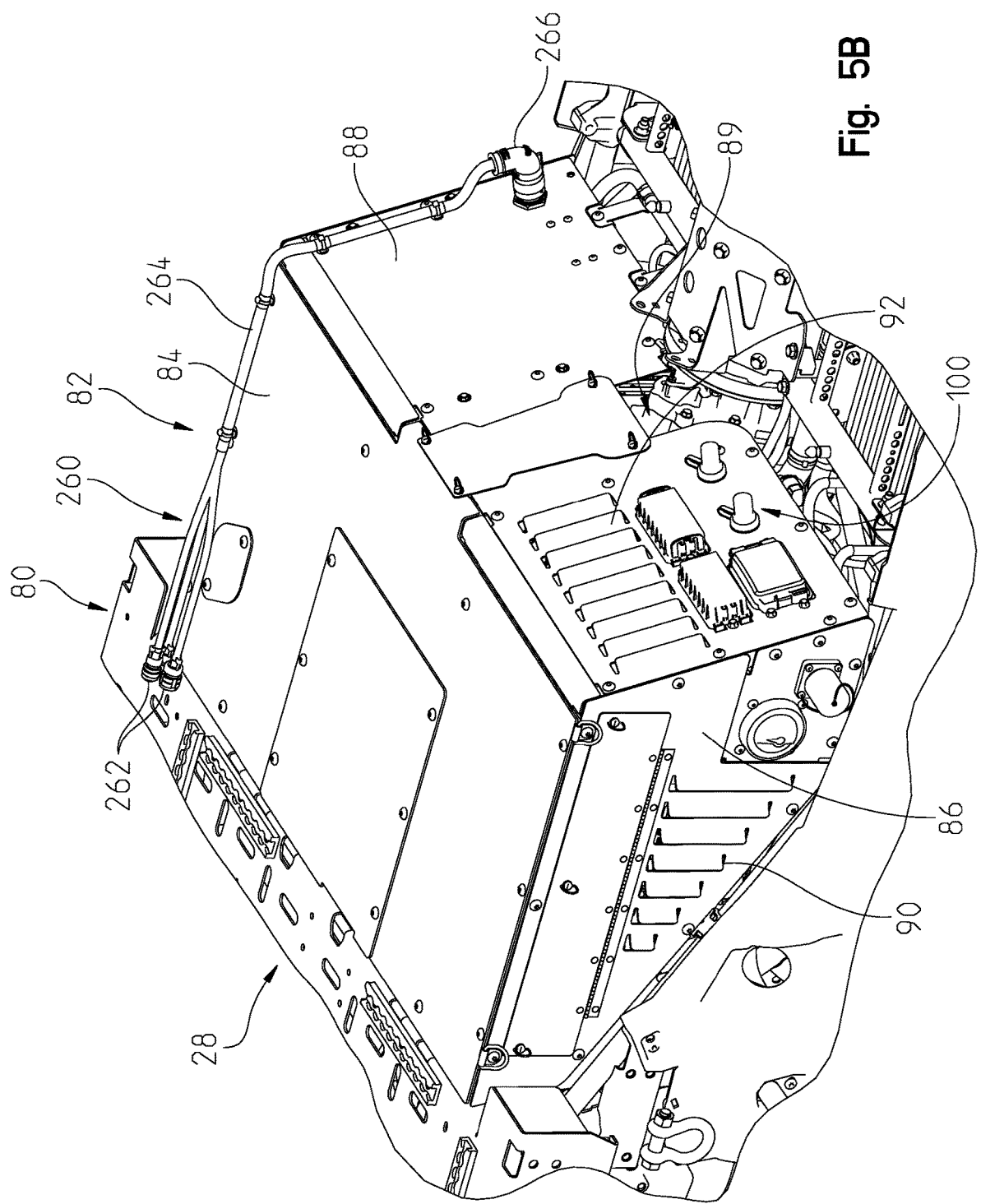
FIG. 5B is a front right perspective view of the cooling assembly and housing of FIG. 5A.
Figure 6:
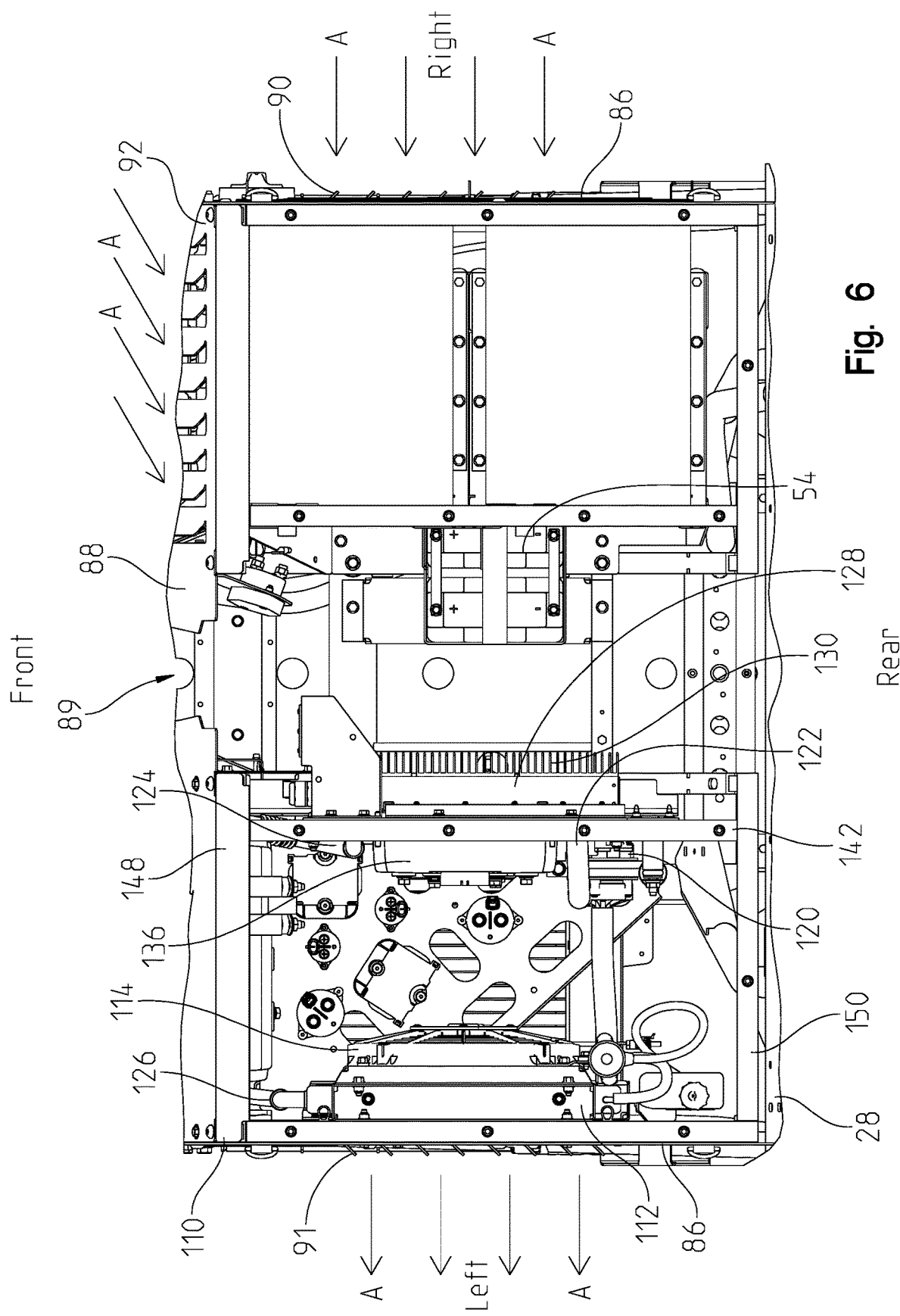
FIG. 6 is a top view of the cooling assembly and indicating air flow therethrough.

Referring still to FIGS. 5A-11, cooling assembly 80 includes a frame 110, a heat exchanger or radiator 112, a fan 114 fluidly coupled to heat exchanger 112, a plurality of cooling plates 116, 118 supported by frame 110, an electric water pump 120, and various cooling conduits, such as conduit 117 (FIG. 7) configured to flow cooling water between motor/generator 50 (FIG. 2) and heat exchanger 112 and conduit 119 (FIG. 7) configured to flow cooling water between traction motor 52 and heat exchanger 112. Frame 110 of cooling assembly 80 is supported by lower frame assembly 20a of vehicle 10 (FIG. 1A) and, illustratively, as shown in FIG. 6, is supported along the left side of vehicle 10. Heat exchanger 112 is coupled to frame 110 along the left side of vehicle 10 and is positioned intermediate side cover 86 and fan 114. Fan 114 is configured to pull ambient air A from right side cover 86 and front cover 88 through and across housing 82 such that warm air A flows outside of vehicle 10 through heat exchanger 112 and left side cover 86.

Heat exchanger 112 is fluidly coupled to cooling plates 116, 118 through pump 120. More particularly, and as shown best in FIG. 9, pump 120 flows cooling water from heat exchanger 112 into a first conduit 121 to flow the water into first cooling plate 116 through a second conduit 122. The cooling water circulates through first cooling plate 116 and flows from first cooling plate to second cooling plate 118 through a third conduit 124. From second cooling plate 118, the water may flow through a fourth conduit 126 which is fluidly coupled to conduit(s) 117 and/or 119 for flowing cooling water to motor/generator 50 and/or traction motor 52. It may be appreciated that the water flowing through first and second cooling plates 116, 118, motor/generator 50, and/or traction motor 52 is heated and, therefore, ultimately flows back into heat exchanger 112 to be cooled therein.

As shown in FIGS. 7-10B, frame 110 also may support various components of electrical assembly 100 for providing cooling thereto. More particularly, a charger 128 of electrical assembly 100 is positioned on frame 110 adjacent a first surface 132 of first cooling plate 116. Charger 128 may include a heat sink, defined by a plurality of cooling fins 130, positioned laterally outward thereof such that charger 128 is positioned laterally intermediate cooling fins 130 and first cooling plate 116. It may be appreciated that charger 128 is positioned generally below an access plate or cover 85 of housing 82, as shown in FIG. 5A, such that charger 128 is easily accessible for repairs or replacement. Additionally, an access plate or cover 87 is positioned on a forward end of housing 82 to also provide access to various components of electrical assembly 100, such as charger 128, switches, a manual shift for traction motor 52 (FIG. 2), etc.

Additionally, a first motor controller 136, illustratively a generator control unit ("GCU") for motor/generator 50, may be positioned adjacent a second surface 134 of first cooling plate 116. More particularly, and still referring to FIGS. 7-10B, motor controller 136 is part of electrical assembly 100 and is supported on frame 110 on an opposing side of first cooling plate 116 from charger 128. In this way, first cooling plate 116 is positioned laterally intermediate charger 128 and first motor controller 136 and, as such, first cooling plate 116 is able cool both first motor controller 136 and charger 128. Because of cooling fins 130, charger 128 is cooled through convection as ambient air passes fins 130; however, charger 128 also is cooled through the liquid cooling system of cooling assembly 80 through contact with first cooling plate 116. As such, while first cooling plate 116 is necessary for cooling first motor controller 136, first cooling plate 116 also provides enhanced cooling to charger 128. Therefore, first cooling plate 116 is configured to cool multiple components of electrical assembly 100 by positioning electrical components on both sides of first cooling plate 116.

Figure 11:
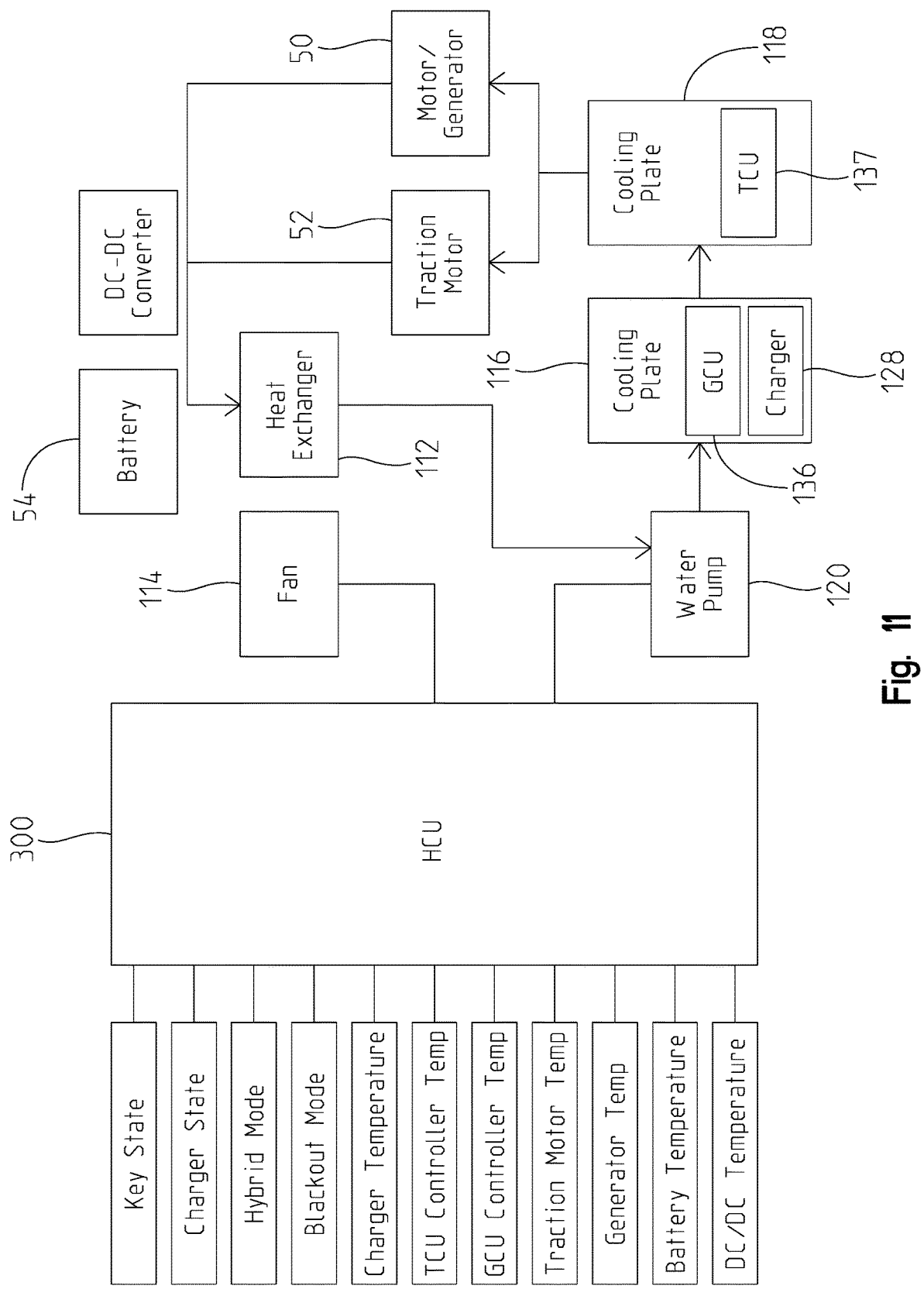
FIG. 11 is a logic diagram for operation of the cooling assembly of FIG. 7.
Figure 12:
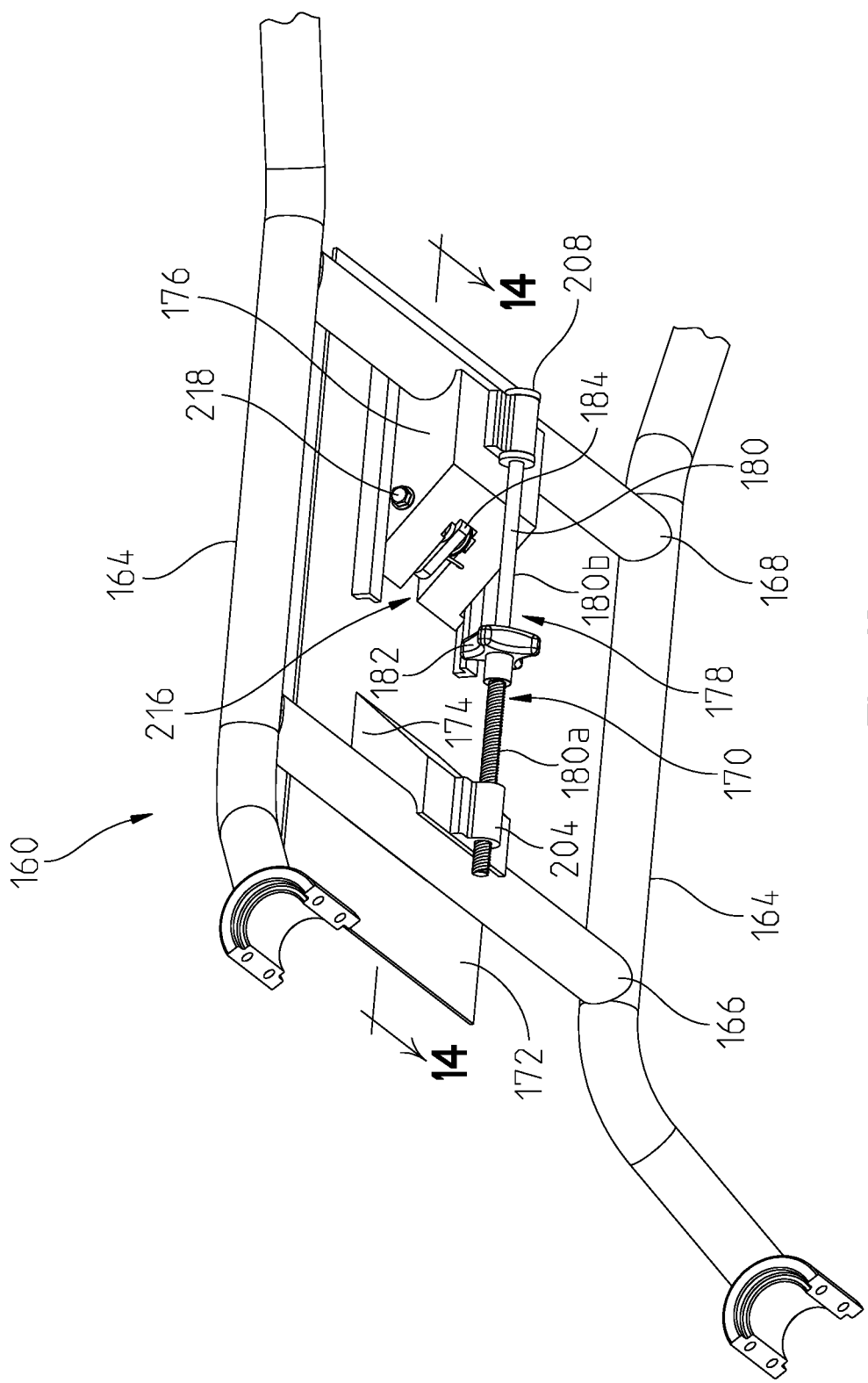
FIG. 12 is a front left perspective view of a portion of a frame assembly of the vehicle of FIG. 1A and an accessory mounting assembly.
Figure 13:
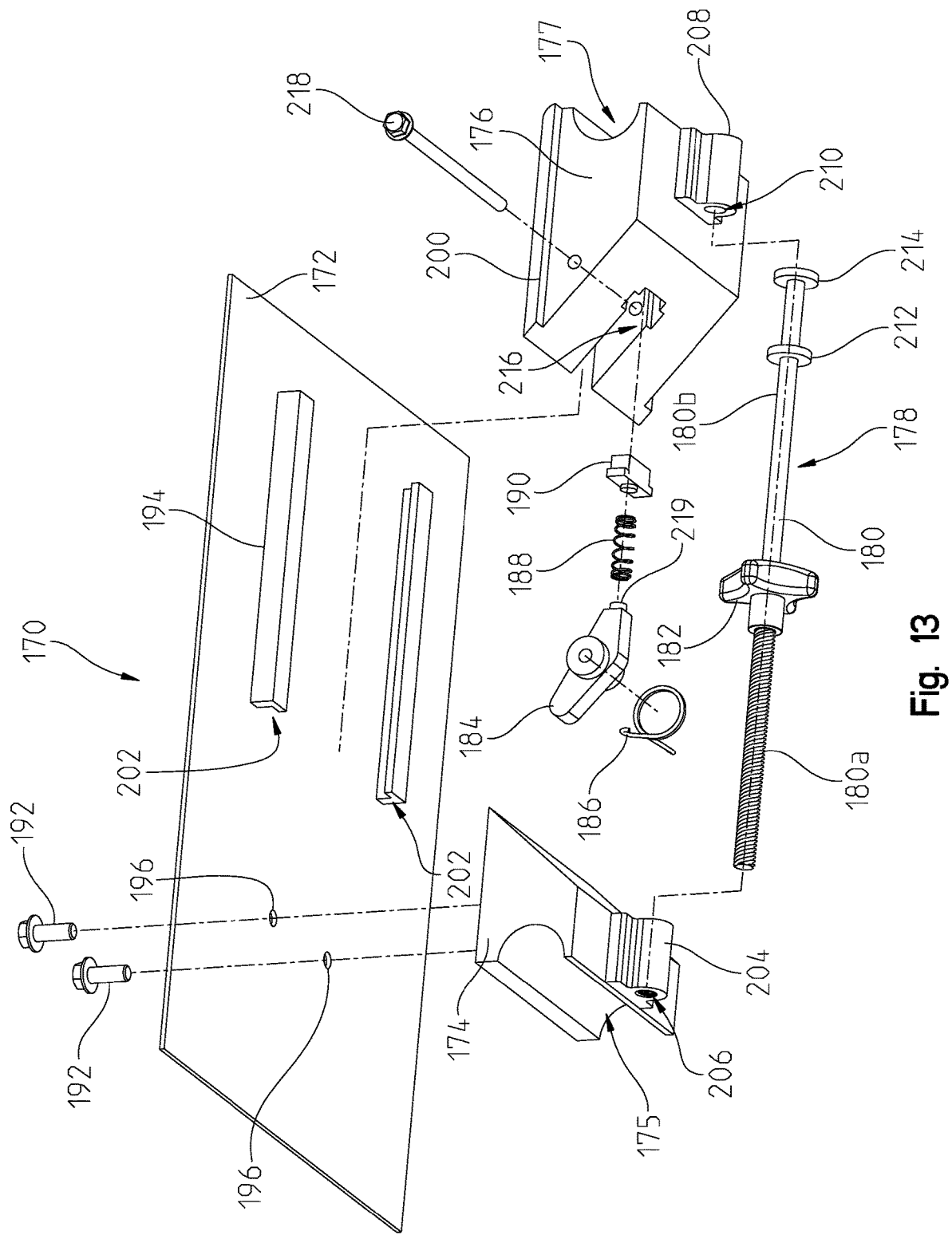
FIG. 13 is an exploded view of the accessory mounting assembly of FIG. 12.
Figure 14:
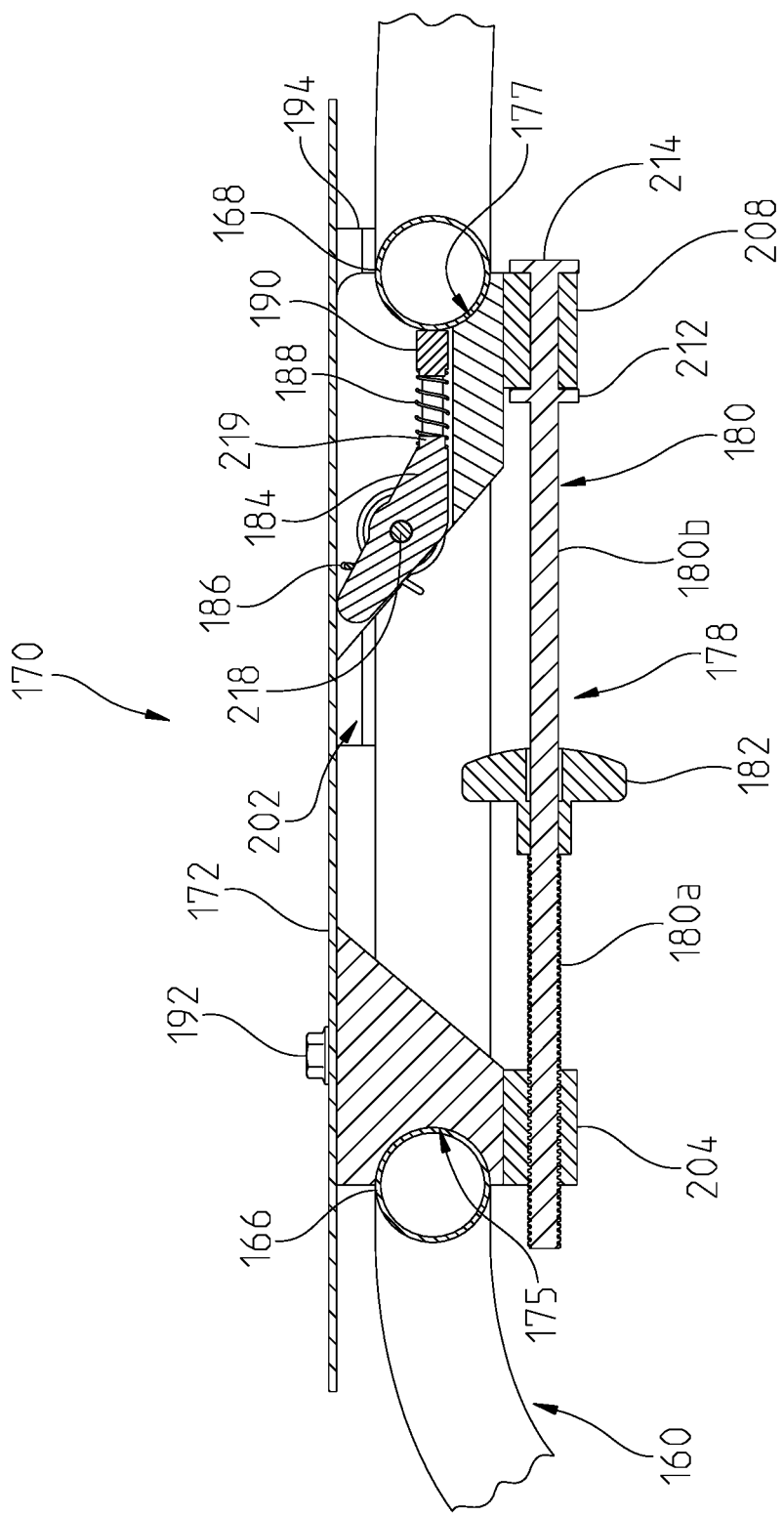
FIG. 14 is a cross-sectional view of the accessory mounting assembly of FIG. 12, taken along line 14-14 of FIG. 12.
Figure 15:
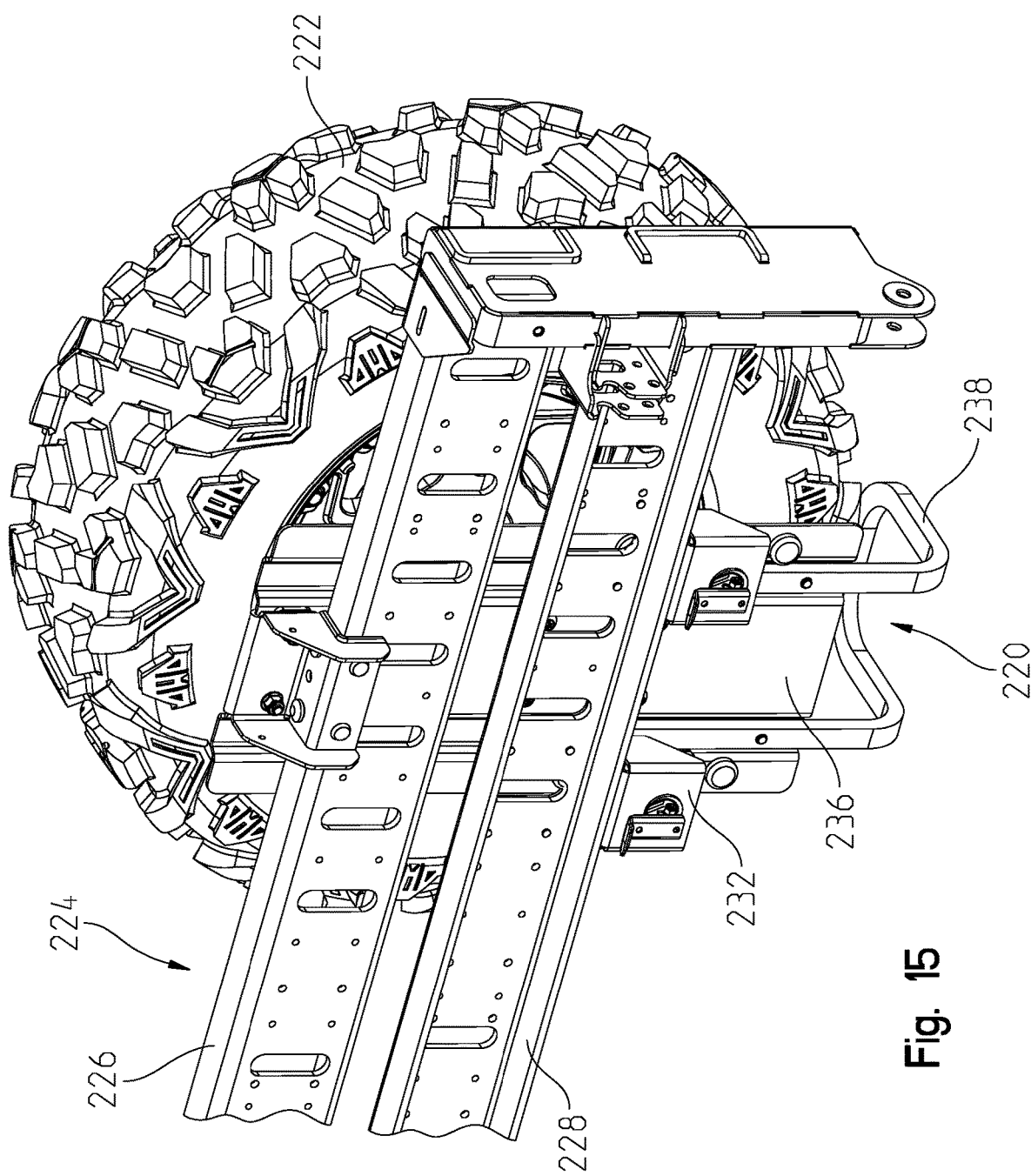
FIG. 15 is a front left perspective view of a spare tire holder of the vehicle of FIG. 1A.
Figure 16:
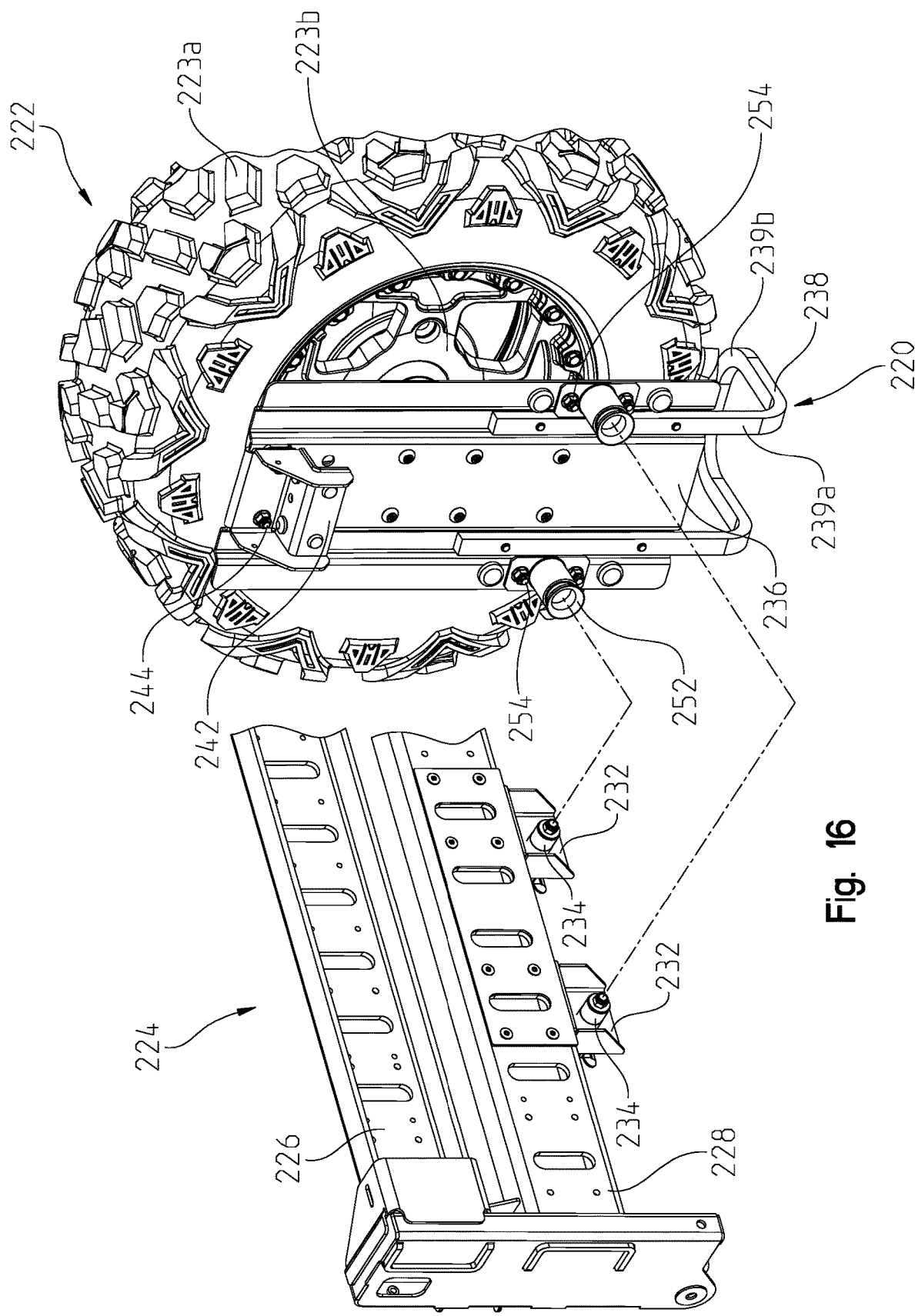
FIG. 16 is an exploded view of the spare tire holder of FIG. 15.
Figure 17:
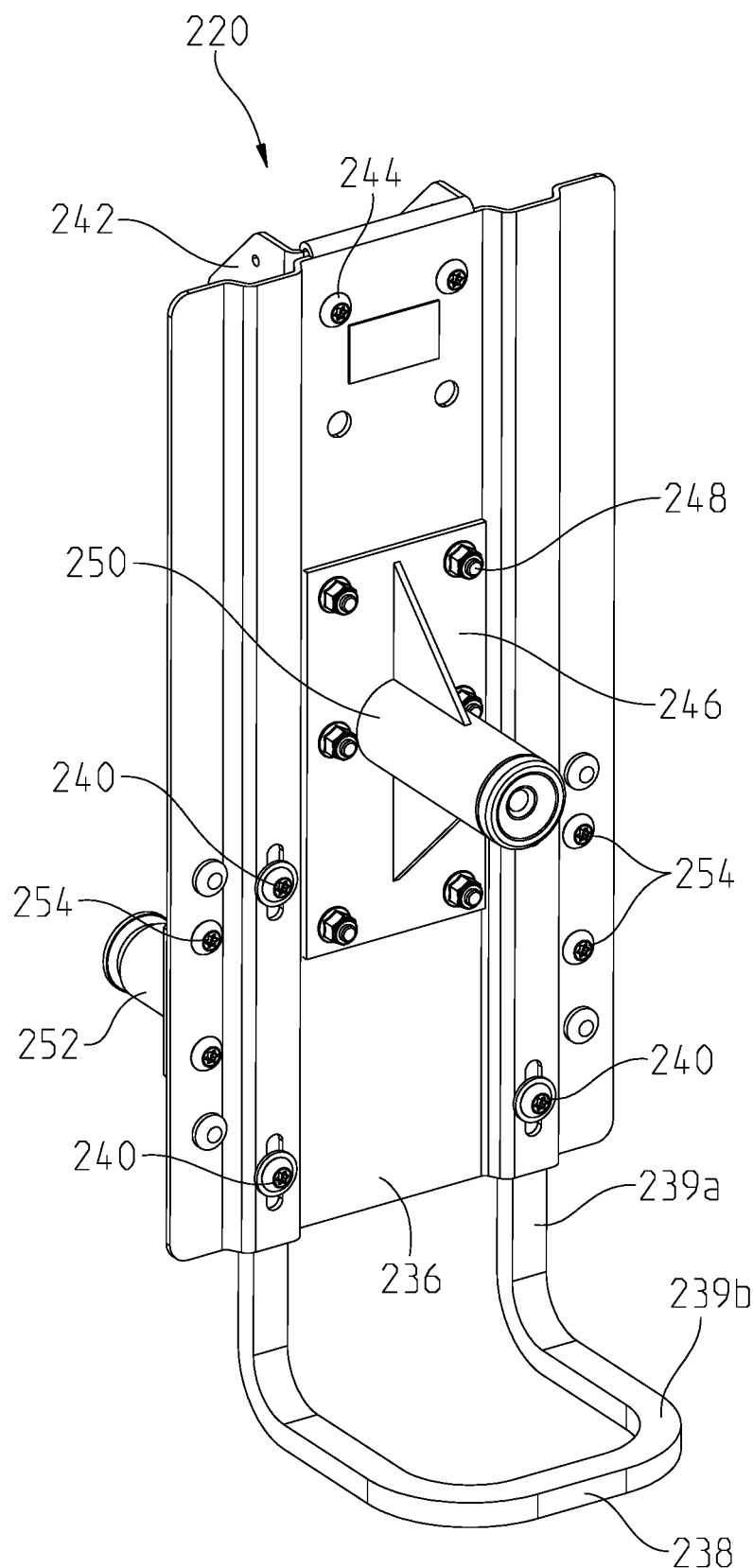
FIG. 17 is a rear left perspective view of a frame assembly of the spare tire holder of FIG. 15.
Figure 18:
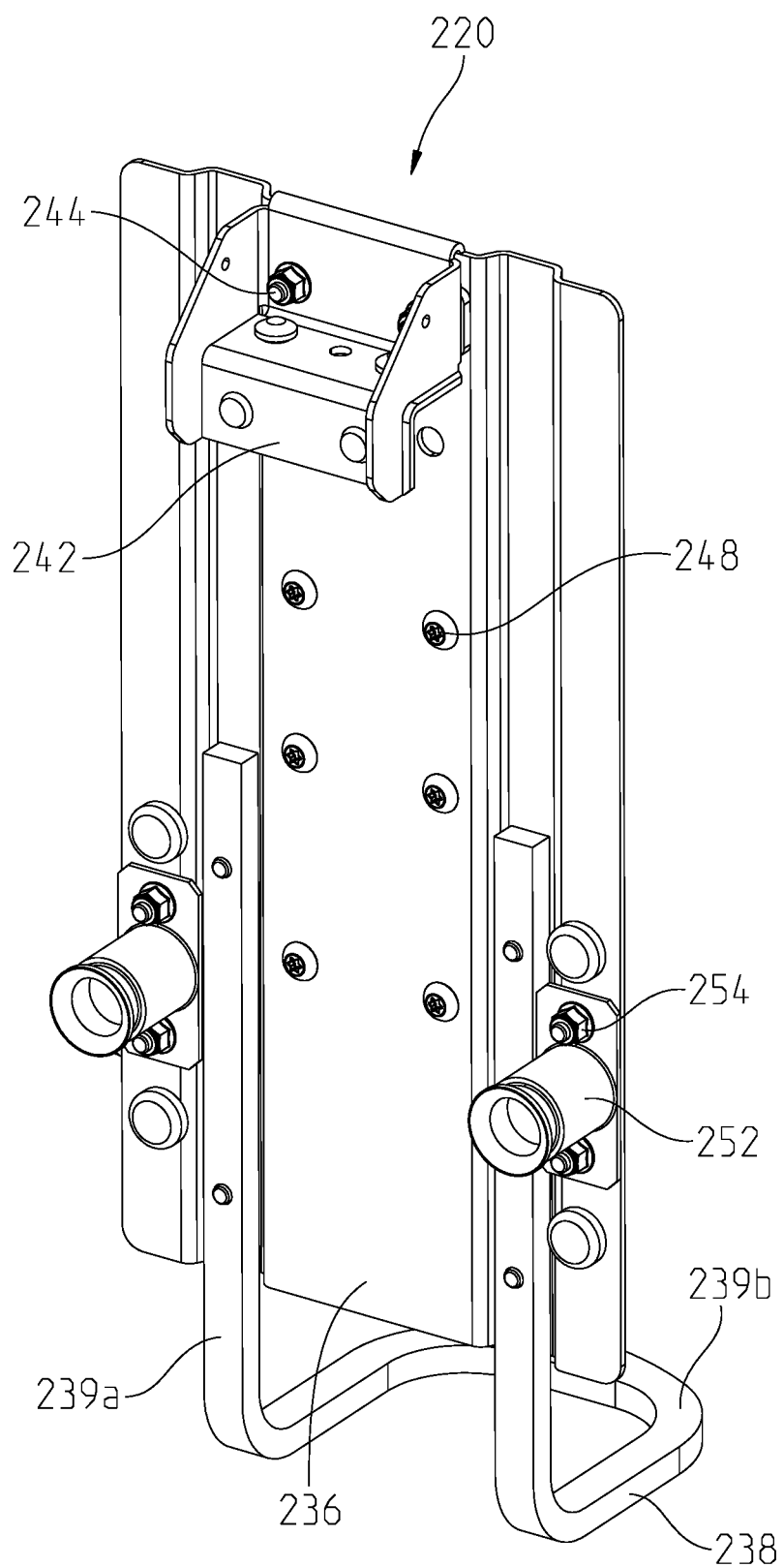
FIG. 18 is a front left perspective view of the frame assembly of the spare tire holder of FIG. 17.

It may be appreciated, and based on FIG. 11 disclosed herein, that in various embodiments, first motor controller 136 and charger 128 do not operate at the same time and, therefore, first cooling plate 116 is only needed to cool either first motor controller 136 or charger 128 at any given time. More particularly, the same cooling plate 116 for charger 128 and first motor controller 136 can be optimally used because both charger 128 and first motor controller 136 do not operate and produce heat at the same time, but rather, charger 128 is used for charging batteries 54 from an external AC source, whereas first motor controller 136 is used to charge batteries 54 when vehicle 10 is in operation or in a stationary power mode.

Figure 7:
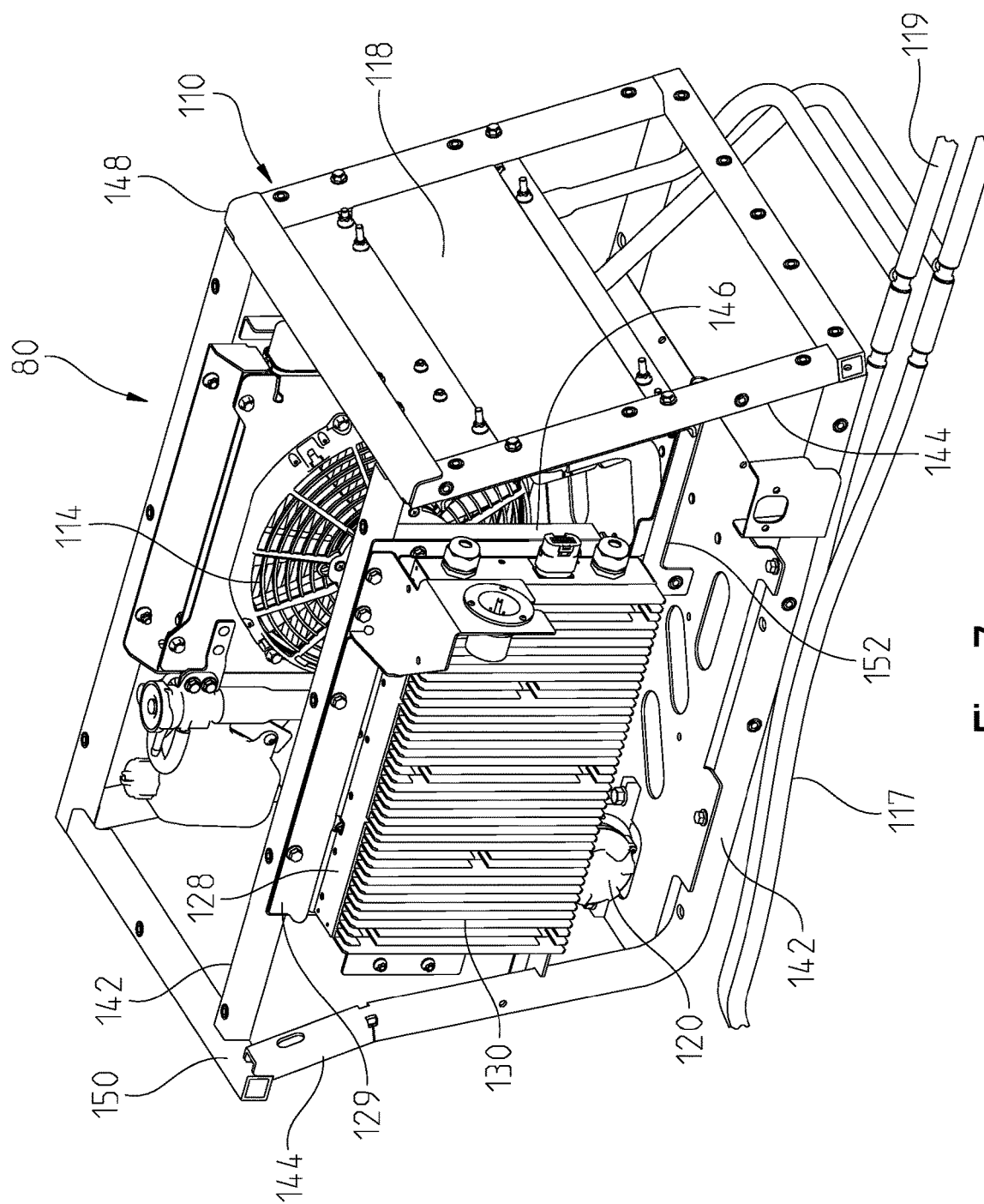
FIG. 7 is a front right perspective view of the cooling assembly of FIG. 5A with the housing removed.

To support first cooling plate 116, charger 128, and first motor controller 136 on vehicle 10, frame 110 includes a side portion 140 comprised of at least longitudinally-extending members 142, upstanding members 144, mounting members 146, a front cross-member 148, a rear cross-member 150, and a mounting rack 152. In embodiments, mounting rack 152 is configured to support various components of electrical assembly 100, such as a generator. Illustratively, upstanding members 144 are coupled to front cross-member 148 and are configured to support second cooling plate 118 thereon. Longitudinally-extending member 142 is coupled to a support plate 154 with removable fasteners (not shown). Support plate 154 is configured to support charger 128 on a first side thereof and support first cooling plate 116 and first motor controller 136 on a second side thereof. In one embodiment, first motor controller 136 is removably coupled to first cooling plate 116 instead of support plate 154, however, in alternative embodiments, first motor controller 136 may be coupled to support plate 154 or any portion of frame 110. Charger 128 is coupled to longitudinally-extending member 142 with a mounting bracket 129, as shown in FIG. 7.

Figure 8:
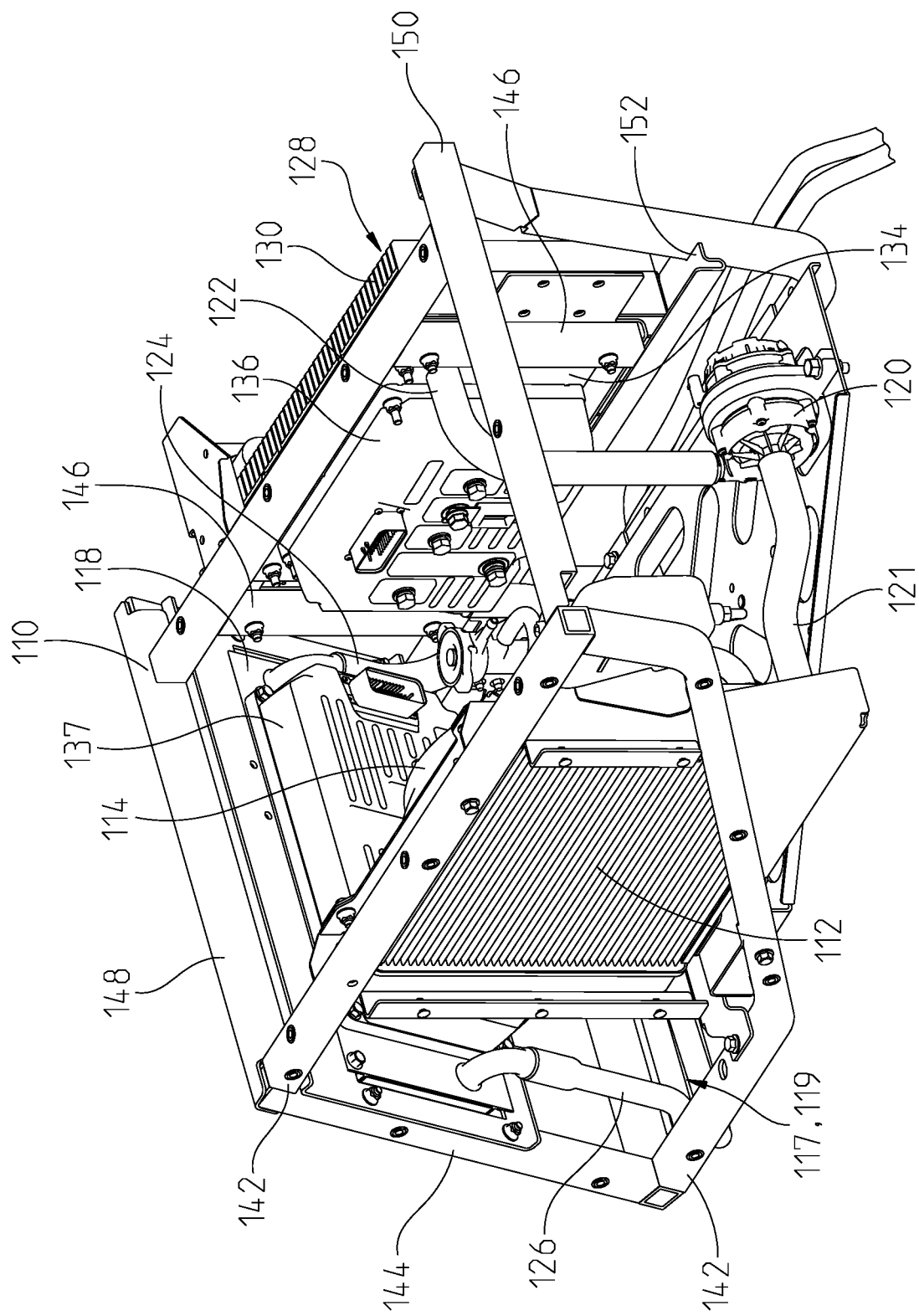
FIG. 8 is a rear left perspective view of the cooling assembly of FIG. 7.
Figure 9:
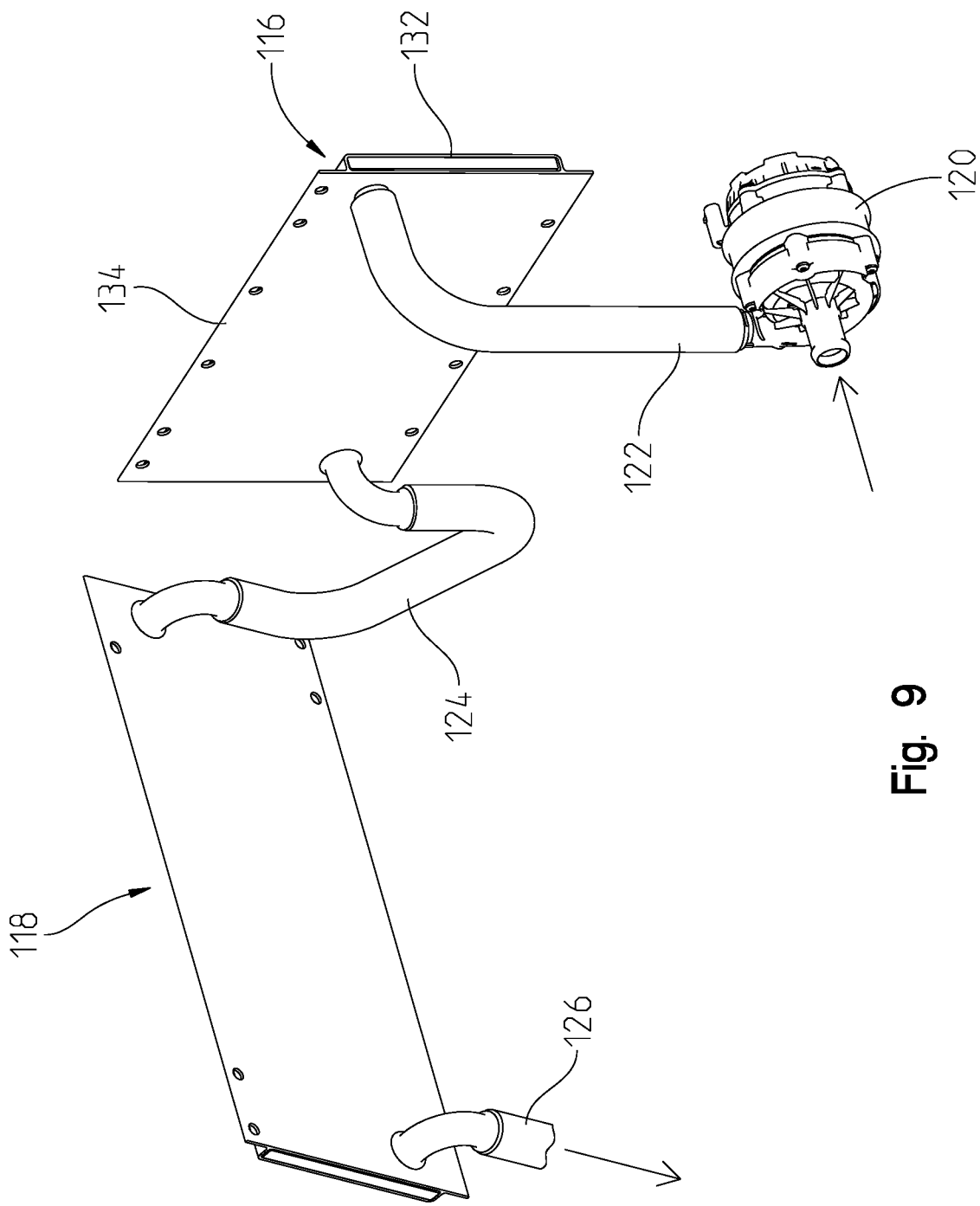
FIG. 9 is a rear left perspective view of a plurality of cooling plates and a water pump of the cooling assembly of FIG. 7.
Figure 10A:
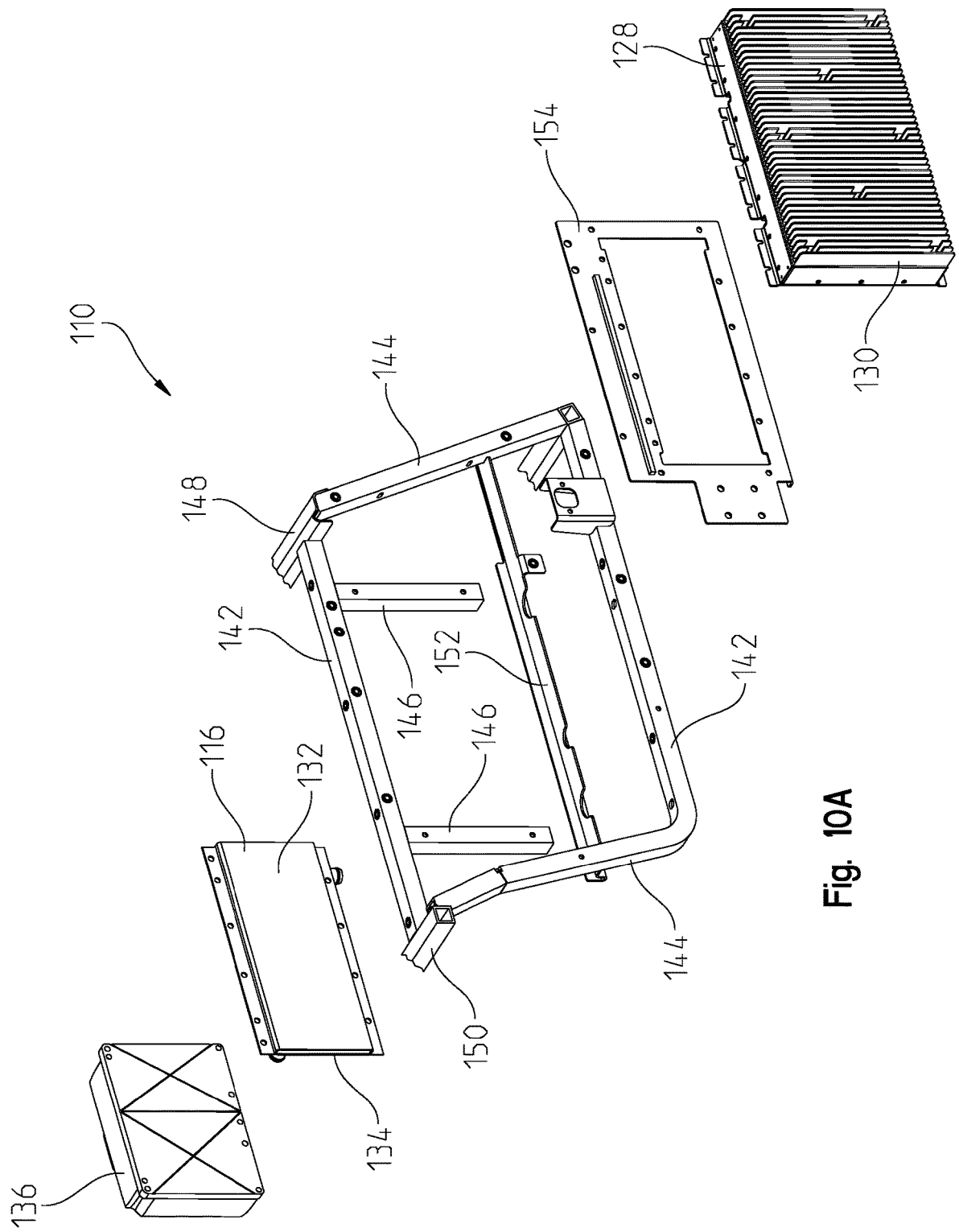
FIG. 10A is a front exploded view of low- and high-voltage electrical components, a cooling plate, and a frame assembly.
Figure 10B:
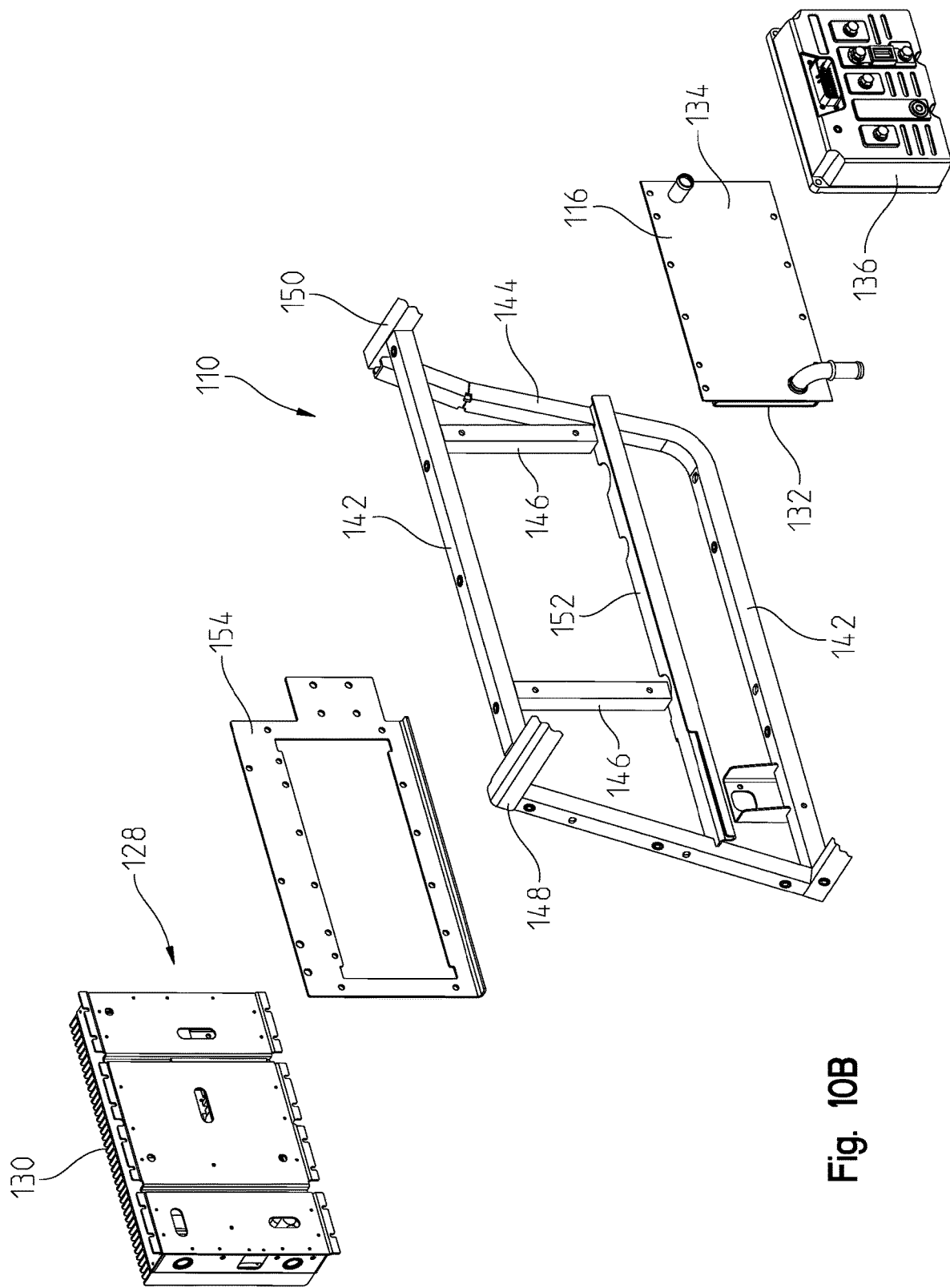
FIG. 10B is a rear exploded view of the low- and high-voltage electrical components, a cooling plate, and a frame assembly of FIG. 10A.

As shown best in FIG. 8, electrical assembly 100 also includes a second motor controller 137, illustratively a traction control unit ("TCU") for traction motor 52, positioned rearward of second cooling plate 118. Second motor controller 137 is positioned generally perpendicularly to first motor controller 136. While second motor controller 137 is removably coupled to second cooling plate 118, second motor controller 137 also may be coupled to any portion of frame 110, such as front cross-member 148 and/or upstanding members 144.

At least charger 128, first motor controller 136, and second motor controller 137 define a high-voltage system, circuit, or portion of electrical assembly 100, which is generally positioned on a left side of vehicle 10 and is generally rearward of operator seat 32. However, electrical assembly 100 also includes a low-voltage system, circuit, or portion, which is generally positioned on a right side of vehicle 10 and is generally rearward of front passenger seat 34. The low-voltage system includes fuses, inverters, batteries 54, and other low-voltage components. It may be appreciated that at least one DC-DC converter is included with electrical assembly 100 to convert high voltage to low voltage.

Because the low-voltage system includes components which generate and/or transmit voltages lower than that of the high-voltage components, the low-voltage system of electrical assembly 100 may not generate as much heat as the high-voltage system. As such, it is sufficient to cool and maintain the temperature of the low-voltage system through natural convection cooling using ambient air A. Conversely, because the high-voltage system includes components which generate and/or transmit voltages higher than that of the low-voltage system, the high-voltage system of electrical assembly 100 generates more heat than the low-voltage system and may require an enhanced cooling system, such as the liquid-cooling system of cooling assembly 80. As such, the low-voltage components cooled through convection may be cooled at different (e.g., lower) rate of cooling than the high-voltage components cooled through liquid cooling. However, the components of the high-voltage system are positioned within the air flow path of the ambient air A for cooling the low-voltage system, so the high-voltage system is cooled through both the liquid cooling assembly 80 and through convection with ambient air A. More particularly, the components of the low-voltage system are positioned adjacent to the openings and louvers 90, 92 such that they are close to the intake of ambient air A for efficient cooling. Fan 114 draws air into housing 82 at the right side of vehicle 10 such that the ambient air A is pulled across the low-voltage components. As the ambient air A flows through housing 82 and towards radiator 112, the ambient air A also passes over the high-voltage components after flowing past the low-voltage components because the high-voltage components are positioned downstream of the low-voltage components. As such, components of vehicle 10 are strategically positioned rearward of seats 32, 34 such that the ambient air A can be used to facilitate cooling of both the low- and high-voltage components.

While the illustrative embodiments of FIGS. 5A-10B disclose that the low-voltage components, such as batteries 54, are cooled through convection using ambient air A, cooling assembly 80 also is configured to cool the low-voltage components using the liquid cooling system thereof. For example, cooling assembly 80 may be configured to insert the low-voltage components into the liquid cooling system through fluid conduits and other components coupled to heat exchanger 112.

For operation of the liquid cooled system of cooling assembly 80, reference is made to FIG. 11. HCU 300 receives a plurality of inputs from various components of vehicle 10, such as inputs related to the state or status of the ignition key/switch 306, the state of charger 128, the state of hybrid mode input 68b, the state of the blackout mode input on display 58 (FIG. 3), the temperature of charger 128, the temperature of second motor controller 137, the temperature of first motor controller 136, the temperature of traction motor 52, the temperature of motor/generator 50, the temperature of batteries 54, and/or the temperature of the DC-DC converter(s). With these inputs, HCU 300 determines if pump 120 of the liquid cooling system and/or fan 114 should be activated. If pump 120 and/or fan 114 are activated, pump 120 and/or fan 114 continue to be active before and/or after a component is needed in order to keep the component temperatures low and allow for maximizing the performance of the liquid cooling system.

Referring still to FIG. 11, if charging (via charger 128) is actuated, the key state is used to determine if vehicle 10 is in the "Key OFF" charging position or "Key ON" charging position. When in the "Key OFF" charging position, the liquid cooling system may be active for any component in cooling assembly 80. Additionally, to minimize noise within cooling assembly 80, pump 120 is turned on first and, only if additional cooling is required, will fan 114 then be turned on also. Additionally, to minimize noise when vehicle 10 operates in the stealth mode and/or the blackout mode, fan 114 can be calibrated to turn off by a switch or automatically turned off by HCU 300.

Referring still to FIGS. 5A and 5B, while various components of electrical assembly 100 are positioned within an internal volume of housing 82, other systems or components of electrical assembly 100 may be supported on the outer surface of housing 82. Illustratively, the outer surface of housing 82 supports a connection assembly 260 of electrical assembly 100. In embodiments, connection assembly 260 allows for external systems or packages to be connected to electrical assembly 100. In embodiments, connection assembly 260 defines an autonomous ready connection assembly configured to quickly and easily plug into an autonomous operation controller, wiring harness, or other such component. More particularly, connection assembly 260 includes adapters or plug connectors 262 configured to receive mating or complementary plugs or adapters of an autonomous operation controller, wiring assembly, or the like. Connectors 262 are electrically coupled to wires or conduits 264 which extend along the outer surface of housing 82 and are electrically coupled to components of electrical assembly 100 within housing 82 through a connector 266 on front cover 88. In this way, connection assembly 260 allows the operator to merely plug in an autonomous operation controller through connectors 262 to quickly connect such a controller to other components of electrical assembly 100 without the need to rewire or reconfigure portions of electrical assembly 100.

In embodiments, connector assembly 260 includes the SMET required IOP signals which allows autonomy packages to be simply connected to electrical assembly 100 through connectors 262. When vehicle 10 operates with an autonomous package, vehicle 10 has the ability for "Follow Me" modes, waypoint navigation, and drive-by-remote options, such as remote driving with a camera.

Referring now to FIGS. 12-18, vehicle 10 also is configured to support a plurality of accessories or cargo thereon. While many accessories and cargo may be supported in rear cargo area 28 (FIGS. 1A and 1B), upper frame assembly 20b also may be configured to support one or more accessories, vehicle components, and/or cargo. In one embodiment, vehicle 10 includes a first portion 160 of upper frame assembly 20b positioned generally over operator seat 32 and front passenger seat 34 and a second portion 162 of upper frame assembly 20b positioned generally over a portion of rear cargo area 28 and is rearward of first portion 160 of upper frame assembly 20b (FIGS. 1A and 1B). At least first portion 160 of upper frame assembly 20b is configured to support an accessory or cargo rack assembly 170. More particularly, rack assembly 170 is supported on longitudinally-extending members 164, a front cross-member 166, and a rear cross-member 168. In one embodiment, members 164, 166, 168 have a circular cross-section, however, it is envisioned that rectangular or other cross-sectional profiles may be used.

Rack assembly 170 includes an accessory plate 172, a first or forward coupler 174, a second or rearward coupler 176, and a tension assembly 178. First and second couplers 174, 176 each include a groove or recessed portion 175, 177 which are configured to receive a portion of cross-members 166, 168, respectively. It may be appreciated that recessed portions 175, 177 can receive cross-members of any shape and merely need to attach to generally parallel cross-members.

Tension assembly 178 allows rack assembly 170 to be adjustably positioned between cross-members 166, 168. Tension assembly 178 includes a shaft 180 having a threaded portion 180a and a non-threaded portion 180b, a tension coupler, illustratively a knob 182, a lever arm 184, a tension member 186 for lever arm 184, a spring 188, and a stop member 190. In embodiments, knob 182 may be a worm gear with a knob, an over-center cam latch or mechanism, or any other similar device or mechanism. Tension assembly 178 is removably coupled to accessory plate 172 with removable fasteners 192 and rails 194. More particularly, fasteners 192 are received through apertures 196 on accessory plate 172 and extend into apertures (not shown) on an upper surface of first coupler 174. As disclosed further herein, first coupler 174 has a fixed position on accessory plate 172 while second coupler 176 is configured to move relative to accessory plate 172.

Additionally, rails 194 are coupled to a lower surface of accessory plate 172 with adhesive, mechanical fasteners, or the like, or may be integrally formed with accessory plate 172. Rails 194 are configured to receive second coupler 176. Illustratively, second coupler 176 includes shoulders 200 which are received within a sliding surface or groove 202 of rails 194 and are configured to retain second coupler 176 between rails 194. Shoulders 200 are configured to slide or translate along the length of rails 194 to allow for movement of second coupler 176, as disclosed further herein.

First coupler 174 of rack assembly 170 includes a first mounting member 204 configured to receive a portion of shaft 180. More particularly, first mounting member 204 includes an opening or through hole 206 configured to receive threaded portion 180*a* of shaft 180. The inner surface of through hole 206 is threaded such that threaded portion 180*a* of shaft 180 is threadedly coupled therein. Non-threaded portion 180*b* of shaft 180 is received within a second mounting member 208 of second coupler 176. Second mounting member 208 also includes an opening or through hole 210 configured to receive non-threaded portion 180*b*. Illustratively, non-threaded portion 180*b* includes a first spacer 212 and a second spacer 214 which are configured to flank and abut second mounting member 208 when the distal end of shaft 180 is positioned within through hole 210. In this way, spacers 212, 214 fix the position of the distal end of shaft 180 with respect to second coupler 176.

Using knob 182, the distance between first and second couplers 174, 176 may be adjusted. More particularly, tension coupler 182 can be rotated along threaded portion 180*a* of shaft 180 to adjust the position of threaded portion 180*a* within first mounting member 204. As threaded portion 180*a* moves within first mounting member 204, second coupler 176 may be moved along rails 194 to move closer to or further from first coupler 174, depending on the distance between first and second cross-members 166, 168 and to allow rack assembly 170 to be coupled to first portion 160 of upper frame assembly 20*b* after assembly of vehicle 10.

Tension assembly 178 is configured to maintain the distance between first and second couplers 174, 176 once rack assembly 170 is coupled to upper frame assembly 20*b*. Illustratively, lever arm 184 is received within an opening 216 of second coupler 176 and is secured therein with a removable fastener 218. Lever arm 184 includes a pin 219 which is received within spring 188 and is configured to contact stop member 190 when spring 188 is fully compressed. Stop member 190 contacts or abuts rear cross-member 168 as lever arm 184 and spring 188 push against stop member 190. Tension member 186 provides a pre-loaded tension or resistance on lever arm 184. In this way, pressure is applied from second coupler 176 to rear cross-member 168 to take up any gap therebetween and maintain the position of rack assembly 170 on upper frame assembly 20*b*. In other words, as tension assembly 178 is tightened against rear cross-member 168, spring 188 is compressed and applies pressure to accessory plate 172 to take up the gap in rails 194 in order to minimize and prevent movement of rack assembly 170 on upper frame assembly 20*b*. Additionally, because this pressure applied to rear cross-member 168 prevents movement of rack assembly 170 on upper frame assembly 20*b*, noise or rattling sounds which could be caused by movement of rack assembly 170 are minimized.

To couple rack assembly 170 on upper frame assembly 20*b*, second coupler 176 may be initially moved along rails 194 towards first coupler 174 to decrease the space between couplers 174, 176. This allows rack assembly 170 to be positioned over cross-members 166, 168 of upper frame assembly 20*b* and first and second couplers 174, 176 to be positioned between cross-members 166, 168. Once recessed portions 175, 177 of first and second couplers 174, 176 are generally aligned with cross-members 166, 168, respectively, tension assembly 178 may be engaged to secure rack assembly 170 to upper frame assembly 20*b*. More particularly, tension coupler 182 may be rotated to move threaded portion 180*a* within first mounting member 204. Because non-threaded portion 180*b* is fixed to second coupler 176, the movement of shaft 180 relative to first mounting member 204 increases the distance between first and second couplers 174, 176 such that second coupler 176 moves rearwardly to engage rear cross-member 168. Once second coupler 176 is engaged with rear cross-member 168, tension coupler 182 may be rotated slightly more such that stop member 190 contacts rear cross-member 168. Continued rotation of tension coupler 182 results in spring 188 being compressed at stop member 190 and tension member 186 engaging lever arm 184. In this way, pressure is applied via tension assembly 178 to maintain the position of second coupler 176 on rear cross-member 168 in order to securely couple rack assembly 170 to upper frame assembly 20*b*.

Once attached to upper frame assembly 20*b*, rack assembly 170 is configured to support a plurality of cargo items, such as spare tires, fire extinguishers, fuel can holders, ammunition holders, a jack for vehicle 10, tool boxes or holders, storage boxes, additional cargo to be transported by the vehicle, vehicle accessories, vehicle components, such as cameras, sensor equipment, body panels of vehicle 10, and any other item. As noted herein, rack assembly 170 is configured to support a plurality of heavy objects and is configured to do so because tension assembly 178 holds rack assembly 170 on upper frame assembly 20*b* in tension. It may be appreciated that the disclosure of rack assembly 170 herein illustrates that rack assembly 170 is coupled to upper frame assembly 20*b* without any tools.

Referring to FIGS. 15-18, vehicle 10 is configured to support additional cargo thereon. Illustratively, vehicle 10 may include a cargo support assembly 220, which as shown, may hold a spare tire 222 thereon. Spare tire 222 includes a tire 223*a* supported on a wheel hub 223*b*. In embodiments, cargo support assembly 220 is coupled to wheel hub 223*b* to secure spare tire 222 to vehicle 10 and, more particularly, to a tail gate 224 of vehicle 10. In this way, cargo support assembly 220 is positioned at rear cargo area 28.

Cargo support assembly 220 includes a mounting surface 236 coupled to a frame member 238. Frame member 258 includes upstanding portions 239*a* and a base portion 239*b*. In embodiments, upstanding portions 239*a* and base portion 239*b* are integrally formed together. Mounting surface 236 is coupled to frame member 238 with removable fasteners 240.

Mounting surface 236 includes an attachment member 242 coupled thereto with fasteners 244. Attachment member 242 has a generally L-shaped configuration and is configured to hook over the top of tail gate 224 when cargo support assembly 220 is positioned thereon. More particularly, attachment member 242 is configured to attach to an upper rail 226 of tail gate 224.

Mounting surface 236 also includes mounting anchors 252 which are coupled thereto with fasteners 254. Mounting anchors 252 extend forwardly from mounting surface 236 and are received over complementary mounting anchors 234 on a lower rail 228 of tail gate 224. Mounting anchors 234 are supported on lower rail 228 with mounts 232. Mounts 232 may be integrally formed with lower rail 228 or may be removably or permanently coupled thereto with fasteners, welds, adhesive, or any other attachment mechanism or material. In this way, cargo support assembly 220 is removably coupled to tail gate 224 with attachment member 242 and mounting anchors 252. Illustratively, mounting anchors 234 and 252 may be configured as Lock & Ride® anchors available from Polaris Industries Inc.

Cargo support assembly 220 is configured to support at least spare tire 222 on vehicle 10 on the opposite side of mounting surface 236 from mounting anchors 252. More particularly, a rear-facing side of mounting surface 236 includes a threaded T-handle 250 configured to threadedly couple with wheel hub 223b of spare tire 222. T-handle 250 is coupled to mounting surface 236 with fasteners 248. As such, vehicle 10 is configured to support a plurality of cargo options at multiple locations of vehicle 10.

While this invention has been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle comprising:
   a plurality of ground engaging members;
   a frame assembly supported by the plurality of ground engaging members;
   a powertrain assembly including an electrical assembly supported by the frame assembly; and
   a cooling system configured for cooling the electrical assembly comprising:
      a housing including a first portion and a second portion having a first cooling path defined therebetween wherein cooling air flows from the first portion to the second portion;
      an air intake through the housing and in fluid communication with the first portion of the housing;
      an air outlet through the housing and in fluid communication with the second portion of the housing; and
      a cooling assembly housed within the housing, the cooling assembly including a second cooling path independent from the first cooling path, the second cooling path including a heat exchanger positioned proximate the second portion of the housing,
      wherein air enters the air intake, flows through the housing along the first cooling path contacting portions of the powertrain assembly, subsequently passes through the heat exchanger to cool a fluid of the second cooling path, and exits the air outlet.

2. The vehicle of claim 1, further comprising an open air operator area supported by the frame assembly including an operator seat and a passenger seat in a side-by-side relationship.

3. The vehicle of claim 2, wherein the heat exchanger of the cooling system is positioned rearward of the operator area.

4. The vehicle of claim 2, wherein the second portion of the housing includes high voltage components that are cooled by the cooling system, the high voltage components positioned rearward of the operator seat.

5. The vehicle of claim 2, wherein the first portion of the housing includes low voltage components that are cooled by the first cooling path, the low voltage components positioned rearward of the passenger seat.

6. The vehicle of claim 2, wherein the powertrain assembly further comprises a continuously variable transmission.

7. The vehicle of claim 6, wherein the powertrain assembly further comprises a shiftable transmission operatively coupled to the continuously variable transmission, a front drive positioned forward of the operator area, and a rear drive positioned rearward of the operator area, the front drive and the rear drive being operatively coupled to the continuously variable transmission through the shiftable transmission.

8. The vehicle of claim 1, wherein the powertrain assembly further includes an electric engine.

9. The vehicle of claim 1, wherein the second cooling path includes liquid cooling.

10. The vehicle of claim 1, wherein the cooling assembly further comprises a fan positioned proximate to the heat exchanger, the fan assisting in a movement of the air along the first cooling path.

11. The vehicle of claim 1, wherein the housing includes a removable top to provide access into an interior of the housing.

12. The vehicle of claim 1, wherein the housing further includes a removeable right side portion and a removable left side portion.

13. The vehicle of claim 1, wherein the housing includes a first group of louvers at the air intake and a second group of louvers at the air outlet.

14. The vehicle of claim 1, wherein the powertrain includes a motor operatively coupled to a battery wherein the motor is cooled by the first cooling path of the cooling assembly.

15. The vehicle of claim 1, wherein the cooling assembly further includes a motor controller positioned within the housing, the motor controller being cooled by both the first cooling path and the second cooling path.

16. The vehicle of claim 15, wherein the motor controller further includes a heat sink defined by a plurality of cooling fins, the plurality of cooling fins configured to allow the air to pass therethrough to cool the motor controller along the first cooling path.

17. The vehicle of claim 1, wherein the frame assembly includes a lower frame assembly and an upper frame assembly coupled to the lower frame assembly, and the upper frame assembly includes parallel members which are configured to receive an accessory mount thereon, wherein the accessory mount includes an accessory surface and an adjustable clamping assembly configured to translate between the parallel members.

18. The vehicle of claim 1, wherein the air intake is positioned at a first end of the housing and the air outlet is positioned at a second end of the housing opposite the first end.

19. The vehicle of claim 1, wherein the fluid of the second cooling path passes through a conduit, and the air passes over a portion of the conduit.

20. A method of cooling a vehicle comprising a powertrain assembly, the powertrain assembly including an electrical assembly having low voltage components and high voltage components wherein at least a portion of the powertrain assembly is arranged within a housing, the method comprising:
   directing air into a first portion of the housing wherein the air contacts portions of the powertrain assembly and is heated as it subsequently flows toward a second portion of the housing, wherein a first cooling path is defined between the first and second portions of the housing;

cooling a first portion of the powertrain assembly via the air flow along the first cooling path and a second portion of the powertrain assembly via a closed loop second cooling path that is independent of the first cooling path; and directing air out from the housing through a heat exchanger of the second cooling path positioned proximate the second portion of the housing.

21. The method of claim 20, wherein the cooling assembly further includes a fan positioned proximate to the heat exchanger, the method further comprising assisting a movement of the air along the first cooling path with the fan.

22. The method of claim 20, further comprising receiving air into an interior of the housing through an air intake positioned on a front side of the housing facing a front of the vehicle.

* * * * *